(12) United States Patent
Fujita et al.

(10) Patent No.: US 10,543,574 B2
(45) Date of Patent: Jan. 28, 2020

(54) MACHINE MOTION TRAJECTORY MEASURING APPARATUS

(71) Applicant: Mitsubishi Electric Corporation, Chiyoda-ku (JP)

(72) Inventors: Tomoya Fujita, Tokyo (JP); Masayuki Uematsu, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 268 days.

(21) Appl. No.: 15/564,264

(22) PCT Filed: Nov. 22, 2016

(86) PCT No.: PCT/JP2016/084562
§ 371 (c)(1),
(2) Date: Oct. 4, 2017

(87) PCT Pub. No.: WO2017/158932
PCT Pub. Date: Sep. 21, 2017

(65) Prior Publication Data
US 2018/0133860 A1    May 17, 2018

(30) Foreign Application Priority Data
Mar. 16, 2016   (JP) ................................ 2016-053139

(51) Int. Cl.
*B23Q 17/12* (2006.01)
*B23Q 17/22* (2006.01)
*G05B 19/19* (2006.01)

(52) U.S. Cl.
CPC ............. *B23Q 17/12* (2013.01); *B23Q 17/22* (2013.01); *G05B 19/19* (2013.01); *B23Q 2717/00* (2013.01); *G05B 2219/37392* (2013.01)

(58) Field of Classification Search
CPC ..... B23Q 17/12; B23Q 17/22; B23Q 2717/00; G05B 19/19; G05B 2219/37392
See application file for complete search history.

(56) References Cited

U.S. PATENT DOCUMENTS

2006/0082340 A1   4/2006  Watanabe et al.
2011/0246132 A1   10/2011 Sato et al.

FOREIGN PATENT DOCUMENTS

CN        1213440 A      4/1999
CN        102245349 A   11/2011
(Continued)

OTHER PUBLICATIONS

International Search Report dated Jan. 31, 2017 in PCT/JP2016/084562 filed Nov. 22, 2016.
(Continued)

*Primary Examiner* — Manuel L Barbee
(74) *Attorney, Agent, or Firm* — Oblon, McClelland, Maier & Neustadt, L.L.P.

(57) ABSTRACT

A machine motion trajectory measuring apparatus includes a three-axis acceleration sensor measuring acceleration of a motion-trajectory measurement subject and outputting the result as an acceleration sensor signal, a sensor signal separation unit separating the acceleration sensor signal into two or more frequency bands, a motor signal separation unit separating a detection position signal into the frequency bands identical to those of the sensor signal separation unit, a data calibration unit calibrating the acceleration sensor signal in each of the two or more frequency bands by using the acceleration sensor signal separated by the sensor signal separation unit and the detection position signal separated by the motor signal separation unit and obtaining a motion trajectory component in each of the two or more frequency bands, and a motion trajectory calculation unit coupling the (Continued)

motion trajectory components in the two or more frequency bands and outputting the result as a motion trajectory.

23 Claims, 18 Drawing Sheets

(56) References Cited

FOREIGN PATENT DOCUMENTS

| | | |
|---|---|---|
| EP | 0258471 B1 | 3/1993 |
| JP | 59-225315 A | 12/1984 |
| JP | 61-007907 A | 1/1986 |
| JP | 61-209857 A | 9/1986 |
| JP | 63-315909 A | 12/1988 |
| JP | 2006-110702 A | 4/2006 |
| JP | 2011-101908 A | 5/2011 |
| JP | 2011-115885 A | 6/2011 |
| JP | 2012-196749 A | 10/2012 |
| JP | 2015-182141 A | 10/2015 |
| WO | 2010/067651 A1 | 6/2010 |

OTHER PUBLICATIONS

Office Action dated Aug. 21, 2019 in Chinese Patent Application No. 201680024212.0, with English-language translation, 24 pages.

MACHINE MOTION TRAJECTORY MEASURING APPARATUS

FIELD

The present invention relates to a machine motion trajectory measuring apparatus that measures a motion trajectory of a machine apparatus, such as a numerical control machine tool, an industrial machine, a robot, or a transfer machine.

BACKGROUND

A servo control apparatus is an apparatus that uses an actuator to perform control such that the position of a driven body, which is a subject to be driven, agrees with a command position while the position of the driven body is detected using a position detector. A multi-degree-of-freedom machine apparatus having a movable range on a two-dimensional plane or in a three-dimensional space, such as a numerical control machine tool, an industrial machine, a robot, or a transfer machine, includes servo control apparatuses, each of which is referred to as a single-degree-of-freedom axis. In such a machine apparatus, actuators attached to the shafts each control a driven body on a corresponding one of the axes so as to drive the driven body. The machine apparatus combines their axial motions to achieve multi-degree-of-freedom machine motion.

Servo control that is performed to cause a motion trajectory to follow a command trajectory or a command path accurately is referred to as trajectory control or contour motion control. If an extraneous disturbance factor, such as friction caused during the trajectory control or a machine structure vibration caused during the trajectory control, causes the servo control apparatus each axis to have a response error, the motion trajectory of the driven body deviates from the command trajectory, and thereby a trajectory error is caused.

In the case of a numerical control machine tool that transfers a motion of each axis onto a workpiece to be machined so as to create a form therein using a cutting tool, a trajectory error of a few tens of micrometers may be deemed as a machining defect. As a countermeasure, feedback control may be performed using a position detector; even so, the position detector cannot detect the position of the subject to be controlled accurately if the installation position of the position detector does not agree with the position of the driven body or if the position of the driven body does not agree with the position of the true subject to be controlled, i.e., the tool or the workpiece. Thus, a trajectory error is caused in the motion trajectory of a subject to be controlled.

If a trajectory error is caused in a motion trajectory, the motion trajectory of the machine is measured to identify a cause of the problem; then, a design change may be made to the machine or various parameters of the servo control apparatuses may be adjusted. In order to adjust the various parameters, it is necessary to measure the amount of deviation of the motion trajectory from the command trajectory with an accuracy of a few micrometers to a few hundreds of micrometers. In Patent Literatures 1, 2, and 3, methods of measuring and detecting a machine motion trajectory are disclosed.

A motion accuracy test method disclosed in Patent Literature 1 measures a relative motion trajectory between two steel balls coupled by a displacement detector by reading a displacement caused in a relative distance between the two steel s when an arc motion is performed in such a manner that the relative distance between the two balls is kept constant. This measuring method, which is called the double ball bar method, has achieved widespread use. In a typical double ball bar method, a trajectory error caused during an arc motion can be measured with an accuracy of a few micrometers by measuring a displacement of the bar in motion using a displacement sensor with the two steel balls mechanically connected.

A numerical control apparatus disclosed in Patent Literature 2 detects the speed or acceleration of the subject to be controlled and compares the detected speed or acceleration to a planned speed or acceleration to detect the occurrence of a trajectory error. In Patent Literature 2, a method of inhibiting a trajectory error by feeding back the detected speed or acceleration component of the trajectory error is also disclosed.

In Patent Literature 3, a method of estimating a motion trajectory of a driven body by performing second order integration on the acceleration of the driven body observed when a sine wave motion is performed using one or more axes is disclosed. In Patent Literature 3, a method of estimating a motion trajectory with high accuracy by changing a sensitivity factor so as to prevent an error caused when the integration is performed from exceeding a threshold value is also disclosed.

CITATION LIST

Patent Literature

Patent Literature 1: Japanese Patent Application Laid-Open No. S61-209857

Patent Literature 2: Japanese Patent Application Laid-Open Ho. S61-007907

Patent Literature Japanese Patent Application Laid-Open No. 2015-182141

SUMMARY

Technical Problem

However, the motion accuracy test method disclosed in Patent Literature 1 has a problem in that the measurable trajectory is limited to an arc. Additionally, the motion accuracy test method disclosed in Patent Literature 1 requires prior calculation of the position of the center of the rotation and a set-up of the apparatus in such a manner that the placement position of one of the balls agrees with the center of the rotation that takes place during the trajectory measurement; thus, the motion accuracy test method is problematic in that the set-up for the test consumes time and effort.

Use of the method of inhibiting a trajectory error disclosed in Patent Literature 2 eliminates such a limit to the measurable trajectory. The use of the method of inhibiting a trajectory error disclosed in Patent Literature 2, however, has a problem in that the amount of trajectory error from the command trajectory of the body driven cannot be obtained because the method uses the acceleration or the speed to detect the occurrence of an error. The method of inhibiting a trajectory error disclosed in Patent Literature 2 can inhibit a trajectory error by feeding back the speed or acceleration. Although the method of inhibiting a trajectory error disclosed in Patent Literature 2 can inhibit a trajectory error by feeding back the speed or acceleration, there is a problem in that it cannot be used to adjust parameters of other trajectory error inhibiting methods. Other trajectory error inhibiting methods include a correction method that uses a friction model to inhibit a trajectory error derived from friction that is referred to as a lost motion or a stick motion.

The method of estimating a motion trajectory disclosed in Patent Literature 3 has a problem in that the measurable trajectory is limited to a sine wave, an arc trajectory achievable by combining sine waves, an oval trajectory, and a sphere trajectory.

Furthermore, in the case of a numerical control machine tool and a robot, the accuracy of a relative motion trajectory between two points at the movable side and the fixed side may be important. Specifically, in the case of a machine of a type in which a tool is attached to a mechanical structure casting on the fixed side and the servo control apparatuses for the axes and a workpiece are attached to the casting, a material is removed from the workpiece through processing in which, while contour control is performed on the workpiece, the tool and the workpiece are caused to interfere with each other. In such a case, a driving reaction force caused due to the reaction to the driving force of a shaft that is a movable part is transmitted to the fixed side via a mechanical structure and may cause a deformation or a vibration to the fixed side. This poses a need to measure a relative motion trajectory between the movable side and the fixed side. The methods disclosed in Patent Literatures 1 to 3, however, are problematic in that their measurement accuracy is low because these techniques cannot take into consideration a relative trajectory error on the fixed side described above.

The present invention has been achieved in view of the above, and an object of the present invention is to provide a machine motion trajectory measuring apparatus that enables highly accurate measurement of a trajectory error in any motion trajectory with a simple set-up.

Solution to Problem

To solve the problems described above and achieve the object, a machine motion trajectory measuring apparatus according to an aspect of the present invention that measures a motion trajectory of a machine apparatus that comprises an actuator and that feeds back a detection position signal output from a position detector that detects a position of the actuator or a position of a driven body and drives the actuator such that a motion trajectory of the driven body follows a command trajectory, includes: an acceleration sensor to measure acceleration of a motion-trajectory measurement subject and output a result as an acceleration sensor signal; and a sensor signal separation unit to separate the acceleration sensor signal into two or more frequency bands. The machine motion trajectory measuring apparatus includes: a detection position signal separation unit to separate the detection position signal into frequency bands identical to the frequency bands of the sensor signal separation unit; a data calibration unit to calibrate the acceleration sensor signal in each of the two or more frequency bands by using the acceleration sensor signal separated by the sensor signal separation unit and the detection position signal separated by the detection position signal separation unit and to obtain a motion trajectory component in each of the two or more frequency bands; and a motion trajectory calculation unit to couple the motion trajectory component in each of the two or more frequency bands and output a result as the motion trajectory.

Advantageous Effects of Invention

The present invention produces an effect of enabling highly accurate measurement of a trajectory error in any motion trajectory with a simple set-up.

DESCRIPTION OF EMBODIMENTS

A machine motion trajectory measuring apparatus according to embodiments of the present invention will now be described in detail with reference to the drawings. The present invention is not limited to the embodiments.

First Embodiment

Figure 1:
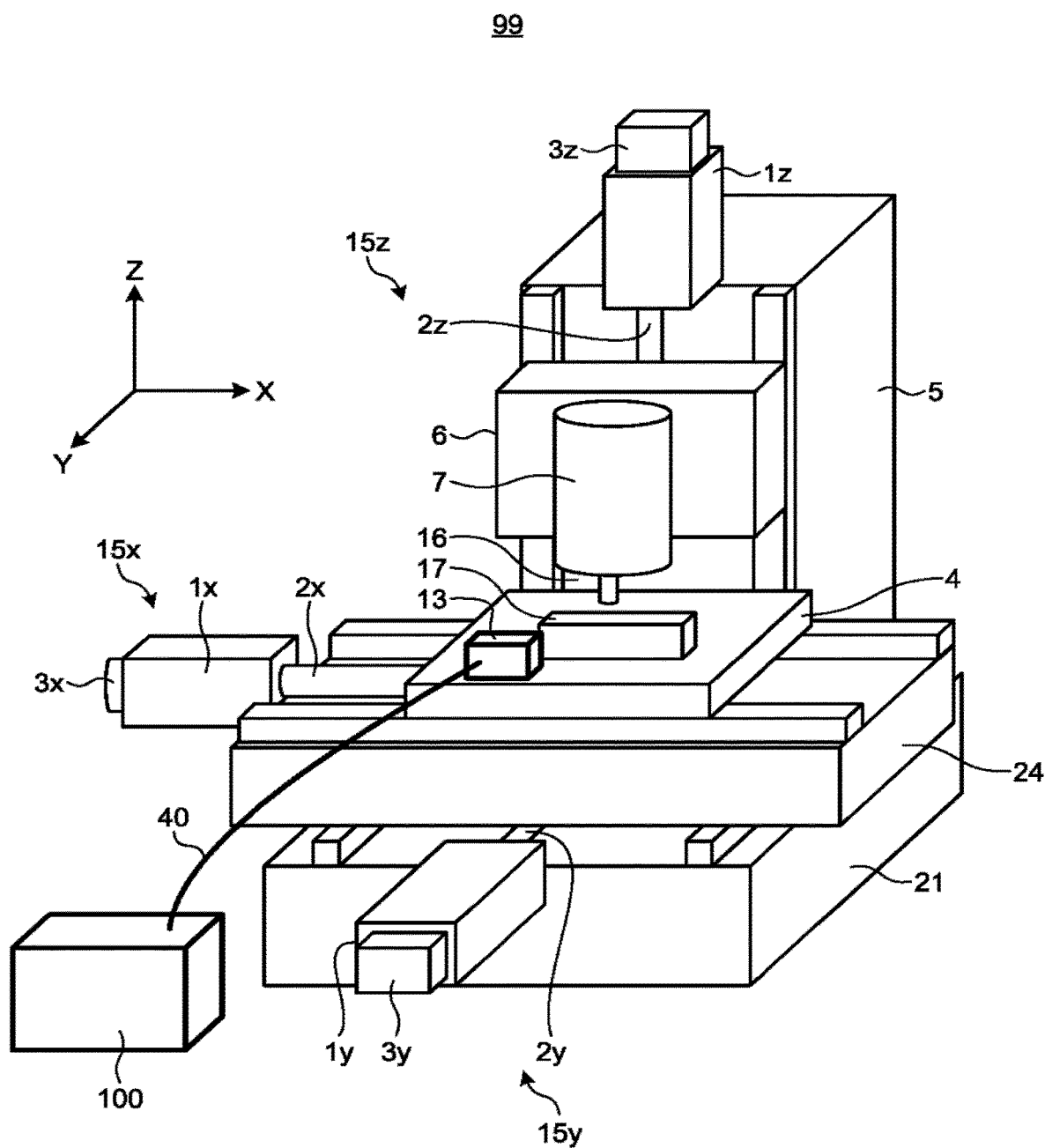
FIG. 1 is a perspective view of a machine motion trajectory measuring apparatus according to a first embodiment and a numerical control machine tool.

FIG. 1 is a perspective view of a machine motion trajectory measuring apparatus according to a first embodiment and a numerical control machine tool. FIG. is a diagram illustrating a detailed configuration of an x-axis driving mechanism illustrated in FIG. 1 and the configuration of a servo control apparatus that controls the action of the x-axis driving mechanism.

A numerical control machine tool 99 illustrated in FIG. 1 is an example subject whose machine motion trajectory is measured by the machine motion trajectory measuring apparatus. The numerical control machine tool 99 is a vertical machine tool that has three orthogonal axes and a machine structure that is referred to as a C column structure. The numerical control machine tool 99 includes a mounting 21; a saddle 24 mounted on the mounting 21 and driven in a y-axis direction; a work table 4 mounted on the saddle 24; and a column 5 fixed to the mounting 21 and extending above the mounting 21. A ram 6 is attached to the column 5, and a workpiece 17, which is a motion-trajectory measurement subject, is placed on the work table 4.

The numerical control machine tool 99 also includes an x-axis driving mechanism 15x, which is an actuator attached to the saddle 24 to drive the work table 4 in an x-axis direction; a y-axis driving mechanism 15y, which is an actuator mounted on the mounting 21 to drive the saddle 24 in a y-axis direction; and a z-axis driving mechanism 15z, which is an actuator mounted on the column 5 to drive the ram 6 in a z-axis direction.

The x-axis driving mechanism 15x includes an x-axis motor 1x; a feed screw 2x, which is a feed shaft driven by the x-axis motor 1x; and a rotary angle detector 3x, which detects a rotary angle of the feed screw 2x. The y-axis driving mechanism 15y includes a 7-axis motor 1y; a feed screw 2y, which is a feed shaft driven by the y-axis motor 1y; and a rotary angle detector 3y, which detects a rotary angle of the feed screw 2y. The z-axis driving mechanism 15z includes a z-axis motor 1z; a feed screw 2z, which is driven by the z-axis motor 1z; and a rotary angle detector 3z, which detects a rotary angle of the feed screw 2z.

The x-axis driving mechanism 15x drives the work table 4, and the y-axis driving mechanism 15y drives the saddle 24 and the x-axis driving mechanism 15x, which is mounted on the top of the saddle 24. The z-axis driving mechanism 15z, which is mounted on the column 5, drives the ram 6, a spindle 7, and a tool 16, and the tool 16 machines the workpiece 17. As a result, a material of the workpiece 17 is removed from a portion of its surface in which the tool 16 and the workpiece 17 are caused to interfere with each other in an x-y-z three-dimensional space, i.e., with three degrees of freedom, achieved by combining the two-degree-of-freedom motion of the workpiece 17 in an xy plane and a single-degree-of-freedom motion of the tool 16, which is attached to the tip of the spindle 7, in the z-axis direction. This creates a three-dimensional form. A motor rotary angle detected by each of the three rotary angle detectors 3x, 3y, and 3z is fed back to a servo control apparatus 101 illustrated in FIG. 2.

Figure 2:
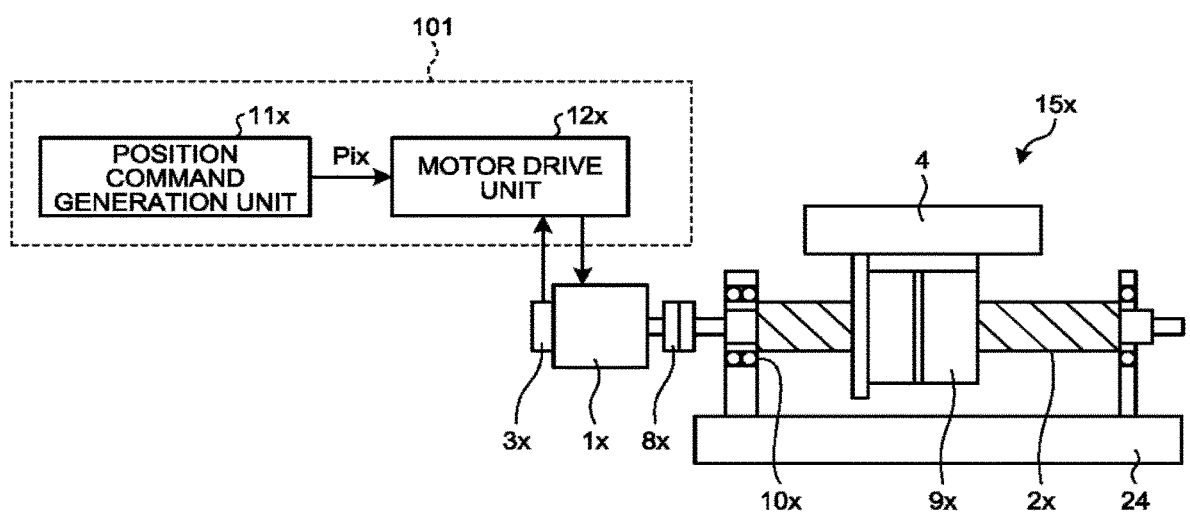
FIG. 2 is a diagram illustrating a detailed configuration of an x-axis driving mechanism illustrated in FIG. 1 and the configuration of a servo control apparatus that controls the action of the x-axis driving mechanism.

In FIG. 2, the detailed configuration of the x-axis driving mechanism 15x illustrated in FIG. 1 is illustrated, and the servo control apparatus 101 for controlling the position of a driven body in the x-axis direction is illustrated. In FIG. 2, the configuration of only the x-axis driving mechanism 15x out of the three driving mechanisms illustrated in FIG. 1 is illustrated. The configurations of the y-axis driving mechanism 15y and the z-axis driving mechanism 15z are similar to the configuration of the x-axis driving mechanism 15x. Note, however, that the x-axis driving mechanism 15x, the y-axis driving mechanism 15y, and the z-axis driving mechanism 15z are different form each other in the following point. That is, the body to be driven, or the subject to be controlled, by the x-axis driving mechanism 15x is the work table 4, while bodies to be driven, or subjects to be controlled, by the y-axis driving mechanism 15y are the saddle 24 and the x-axis driving mechanism 15x attached to the top of the saddle 24, and bodies to be driven, or subjects to be controlled, by the z-axis driving mechanism 15z are the column 5 and the spindle 7 attached to the column 5.

The x-axis driving mechanism 15x illustrated in FIG. 2 includes the saddle 24 and two support bearings 10x each having an outer ring fixed to the saddle 24 and an inner ring rotatably supporting the feed screw 2x. The x-axis driving mechanism 15x also includes a nut 9x in mesh with the feed screw 2x; the work table 4, which is moved by the nut 9x in an axial line direction of the feed screw 2x; and a coupling 8x, which fixes an end of the feed screw 2x during the rotation of the x-axis motor 1x.

A rotational motion of the x-axis motor 1x is transmitted to the feed screw 2x via the coupling 8x, and the rotational motion of the feed screw 2x is translated into a linear motion by the nut 9x. In this manner, the work table 4, which is fixed to the nut 9x, moves along the axial direction of the feed screw 2x.

The feed screw 2x is supported on the support bearings 10x, the x-axis motor 1x and the support bearings 10x are supported on the saddle 24, and the rotary angle detector 3x is supported on the x-axis motor 1x.

The servo control apparatus 101, which is for controlling the position of the driven body in the x-axis direction, includes a position command generation unit 11x, which generates a position command for controlling the position of the driven body in the x-axis direction, and a motor drive unit 12x, which controls the rotary angle of the x-axis motor 1x in accordance with the position command generated by the position command generation unit 11x. While only the servo control apparatus 101, which is for controlling the position of the driven body in the x-axis direction, is illustrated in FIG. 2, servo control apparatuses for controlling the positions of the driven bodies in the y-axis direction and the z-axis direction, respectively, are configured in a similar manner.

A position command generated by the position command generation unit 11x is transmitted to the motor drive unit 12x, and, upon reception of the position command, the motor drive unit 12x controls the rotary angle of the x-axis motor 1x so as to reduce an error between the detection position that is obtained by multiplying the motor rotary angle detected by the rotary angle detector 3x by the screw pitch of the feed screw 2x and the position command.

A linear motor may be used in place of the x-axis motor 1x and the feed screw 2x as a movable shaft of the numerical control machine tool 99. A linear encoder or a laser displacement gauge, which can detect the position of the work table 4 directly, may be used in place of the rotary angle detector 3x as the movable shaft of the numerical control machine tool 99.

A relative displacement between the tool 16 and the workpiece 17 is important in the numerical control machine tool 99. This is because, if a relative displacement is caused between the tool 16 and the workpiece 17 during machining under the contour control and deficient removal and excessive removal of the material of the workpiece 17 are caused, a machining error occurs. To prevent such a machining error from occurring, the motor drive unit 12x of the servo control apparatus 101 performs feedback control.

The position of the detector, however, cannot closely agree with the position of the tool 16 or the workpiece 17; thus, a trajectory error that cannot be detected may be caused. If a dynamic extraneous disturbance, such as friction caused during the trajectory control or a machine structure vibration caused during the trajectory control, causes the feedback control of the motor drive unit 12x to fail to keep up, i.e., if such a disturbance causes the servo control apparatus 101 to have a response error, the motion trajectory of the driven body deviates from the command trajectory, and thereby a relative displacement is caused between the tool 16 and the workpiece 17.

Known dynamic extraneous disturbances include an elastic deformation caused in the coupling 8x, the feed screw 2x, or the support bearings 10x, a vibration caused in the feed screw 2x or the support bearings 10x, a change in position of the column 5 or the ram 6 illustrated in FIG. 1, a vibration in the column 5 or the ram 6, and an error due to a friction force of the movable shaft. It is known that such dynamic extraneous disturbances change depending on the mass of the workpiece 17, aging of the machine, wear in the feed screw 2x or the support bearings 10x, the amount of lubricant in each movable shaft, a change in air temperature, and operation states of other machines in the plant. Because the dynamic extraneous disturbances change depending on such factors, a model-based error correction scheme, in which friction and vibration models are used to estimate the amount of error to be caused, to generate the amount of correction for cancelling the error, and to perform feedforward control, is often used for the position command generation unit 11x and the motor drive unit 12x in order to maintain the performance of the contour control highly accurately.

However, the number of factors that affect the dynamic error is large, and it is thus not realistic to build a model taking into consideration all these factors. Hence, it is desirable to measure the motion trajectory of a machine regularly or continuously before the start of the work or immediately before the finishing process and to have the capability to adjust various correction parameters every time.

In FIG. 1, a three-axis acceleration sensor 13, which is an example subject acceleration sensor that measures the acceleration of the workpiece 17, which is the subject whose motion trajectory is measured, is attached near the workpiece 17. The three-axis acceleration sensor 13 measures the acceleration in each of the three orthogonal axial directions. The three-axis acceleration sensor 13 is mutually connected to a machine motion trajectory measuring apparatus 100 with a cable 40. An acceleration sensor signal indicative of the acceleration in each of the three axial directions detected by the three-axis acceleration sensor 13 is input to the machine motion trajectory measuring apparatus 100 via the cable 40. Acceleration components in the three axial directions detected by the three-axis acceleration sensor 13 are hereinafter referred to as an acceleration component in the x-axis direction, an acceleration component in the y-axis direction, and an acceleration component in the z-axis direction.

Because the three-axis acceleration sensor 13 alone can measure the acceleration in each of the three orthogonal axial directions, the acceleration in the three dimensions can be measured by using the one three-axis acceleration sensor 13. In the present embodiment, three one-axis acceleration sensors that each measure the acceleration in a corresponding one of the three axial directions may be used in place of the three-axis acceleration sensor 13.

Methods of attaching the three-axis acceleration sensor 13 include attaching using a magnetic force of a magnet, fastening using a jig and a screw, fixing with wax, and fixing using an adhesive agent. Measuring is enabled only by fixing the three-axis acceleration sensor 13 to the work table 4, which is the measurement subject; thus, the three-axis acceleration sensor 13 can be attached by doing easy work immediately before the measurement. Additionally, attaching the acceleration sensor does not require special adjustment work; thus, even a novice worker can attach the sensor with ease.

Wireless acceleration sensors requiring no cables are recently on the increase, and use of such a wireless acceleration sensor can further facilitate the installation of the sensor because it eliminates the need to take into consideration routing of the cable 40. The three-axis acceleration sensor 13 may be permanently attached to the back side of or inside the work table 4 in order to prevent damage to the three-axis acceleration sensor 13 and the cable 40 during machining due to chips or a cutting fluid. The machine motion trajectory measuring apparatus 100 may be implemented outside the numerical control machine tool 99 or inside the numerical control machine tool 99.

A description will be given of an exemplary configuration in which the numerical control machine tool 99 is set up for studying the effect of friction on motion trajectory observed when the x axis and the y axis are driven by the servo control apparatus 101.

Figure 3:
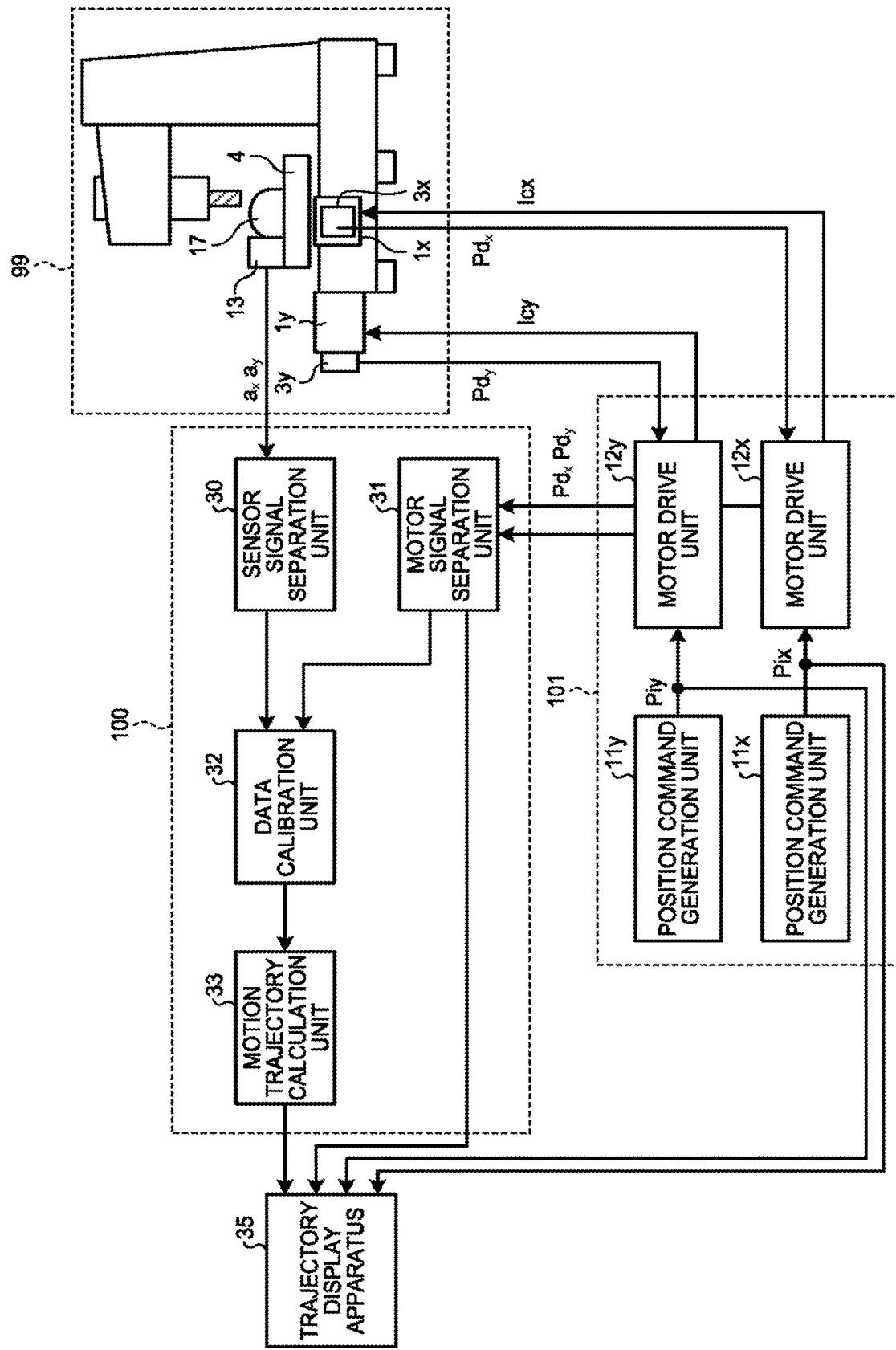
FIG. 3 is a diagram illustrating the machine motion trajectory measuring apparatus according to the first embodiment, the numerical control machine tool that uses the machine motion trajectory measuring apparatus according to the first embodiment, and the servo control apparatus.
Figure 4:
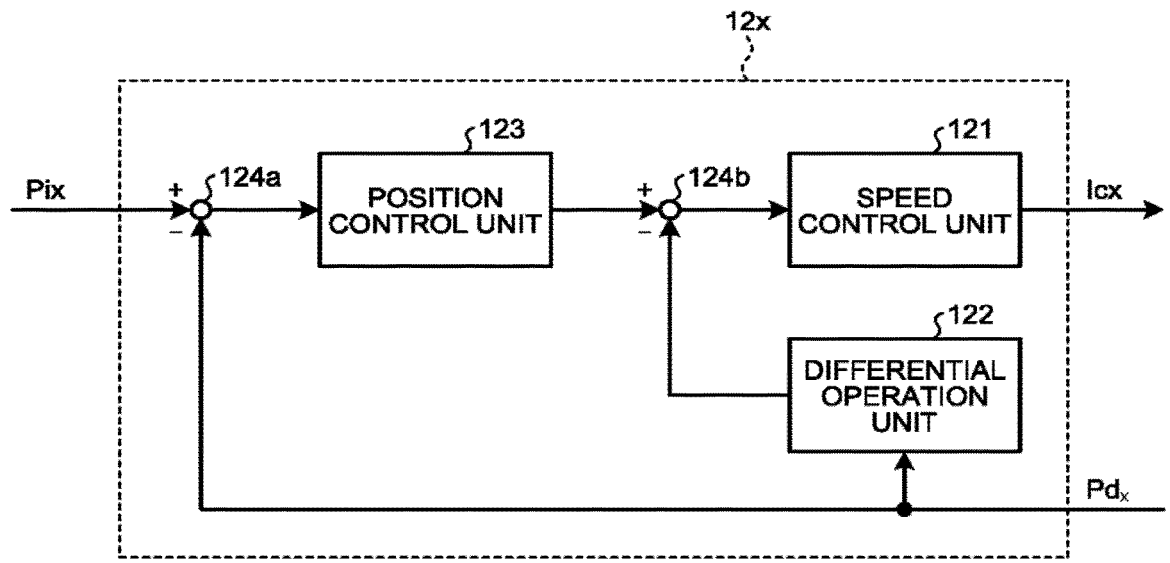
FIG. 4 is a configuration diagram of a motor drive unit illustrated in FIG. 3.

FIG. 3 is a diagram illustrating the machine motion trajectory measuring apparatus according to the first embodiment, the numerical control machine tool that uses the machine motion trajectory measuring apparatus according to the first embodiment, and the servo control apparatus. FIG. 4 is a configuration diagram of the motor drive unit illustrated in FIG. 3.

The servo control apparatus 101 illustrated in FIG. 3 is different from the servo control apparatus 101 illustrated in FIG. 2 in that the servo control apparatus 101 illustrated in FIG. 3 includes a position command generation unit 11y and a motor drive unit 12y in addition to the position command generation unit 11x and the motor drive unit 12x.

A position command Pix, which is generated by the position command generation unit 11x, and a feedback position $Pd_x$, which is a motor rotary angle detected by the rotary angle detector 3x, are input to the motor drive unit 12x. The motor drive unit 12x outputs a torque command Icx, which is a drive command for the x-axis motor 1x, on the basis of the position command Pix and the feedback position $Pd_x$.

A position command Piy, which is generated by the position command generation unit 11y, and a feedback position $Pd_y$, which is a motor rotary angle detected by the rotary angle detector 3y, are input to the motor drive unit 12y. The motor drive unit 12y outputs a torque command Icy, which is a drive command for the y-axis motor 1y, on the basis of the position command Piy and the feedback position $Pd_y$.

FIG. 4 illustrates the configuration of the motor drive unit 12x illustrated in FIG. 3. The motor drive unit 12x includes an adder-subtracter unit 124a, which obtains a position deviation that is a response error between the position command Pix and the feedback position $Pd_x$ or a response position; and a position control unit 123, which performs control in response to the position deviation obtained by the adder-subtracter unit 124a and generates a speed command. The motor drive unit 12x also includes a differential operation unit 122, which performs differential operation on the feedback position Pd to calculate a speed feedback value; an adder-subtracter unit 124b, which obtains a speed deviation between the speed command obtained by the position control unit 123 and the speed feedback value obtained by the differential operation unit 122; and a speed control unit 121, which outputs the torque command Icx, which is the drive command.

The adder-subtracter unit 124a obtains the position deviation that is a deviation between the position command Pix and the feedback position $Pd_x$, and outputs the position deviation to the position control unit 123. The position control unit 123 performs position control processing, such as proportional control, proportional integral (PI) control, or proportional integral differential (PID) control, such that the position deviation that is output by the adder-subtracter unit 124a is reduced, and outputs the speed command that reduces the position deviation.

The differential operation unit 122 obtains an actual speed obtained by differentiating the feedback position $Pd_x$. The adder-subtracter unit 124b obtains the speed deviation that is the deviation between the speed command obtained by the position control unit 123 and the actual speed obtained by the differential operation unit 122 from the feedback position $Pd_x$ and outputs the speed deviation to the speed control unit 121. The speed control unit 121 performs speed control processing of the PI control such that the speed deviation that is output by the adder-subtracter unit 124b is reduced, and outputs the torque command Icx. The motor drive unit 12y illustrated in FIG. 3 is configured similarly to the motor drive unit 12x illustrated in FIG. 4.

Control that uses the rotary angle detectors 3x and 3y to obtain the feedback positions $Pd_x$ and $Pd_y$ is referred to as semi-closed loop control. In the semi-closed loop control using the servo control apparatus 101 and the x-axis driving mechanism 15x illustrated in FIG. 2, a mechanical structure, such as the feed screw 2x and the nut 9x, is present between the installation position of the rotary angle detector 3x and the work table 4, which is the true subject to be controlled, or between the installation position of the rotary angle detector 3x and the workpiece 17 illustrated in FIG. 1. Hence, a mechanical transmission delay is caused between the rotary angle detector 3x and the work table 4 or between the rotary angle detector 3x and the workpiece 17. Accordingly, the feedback position $Pd_x$ detected by the rotary angle detector 3x does not agree with the motion trajectory of the work table 4 or the workpiece 17.

Additionally, the direction of friction applied is reversed at a motion-direction reversal position, and thus, an abrupt extraneous disturbance force is applied to the movable shaft. Hence, it is known that feedback control cannot completely inhibit a position deviation from occurring and causes an error. A typical example is a trajectory error called a lost motion or a stick motion caused during an arc motion. In an arc motion using the x axis and the y axis, sine wave commands that are 90 degrees out of phase with each other are provided to the x-axis motor 1x and the y-axis motor 1y.

Figure 5:
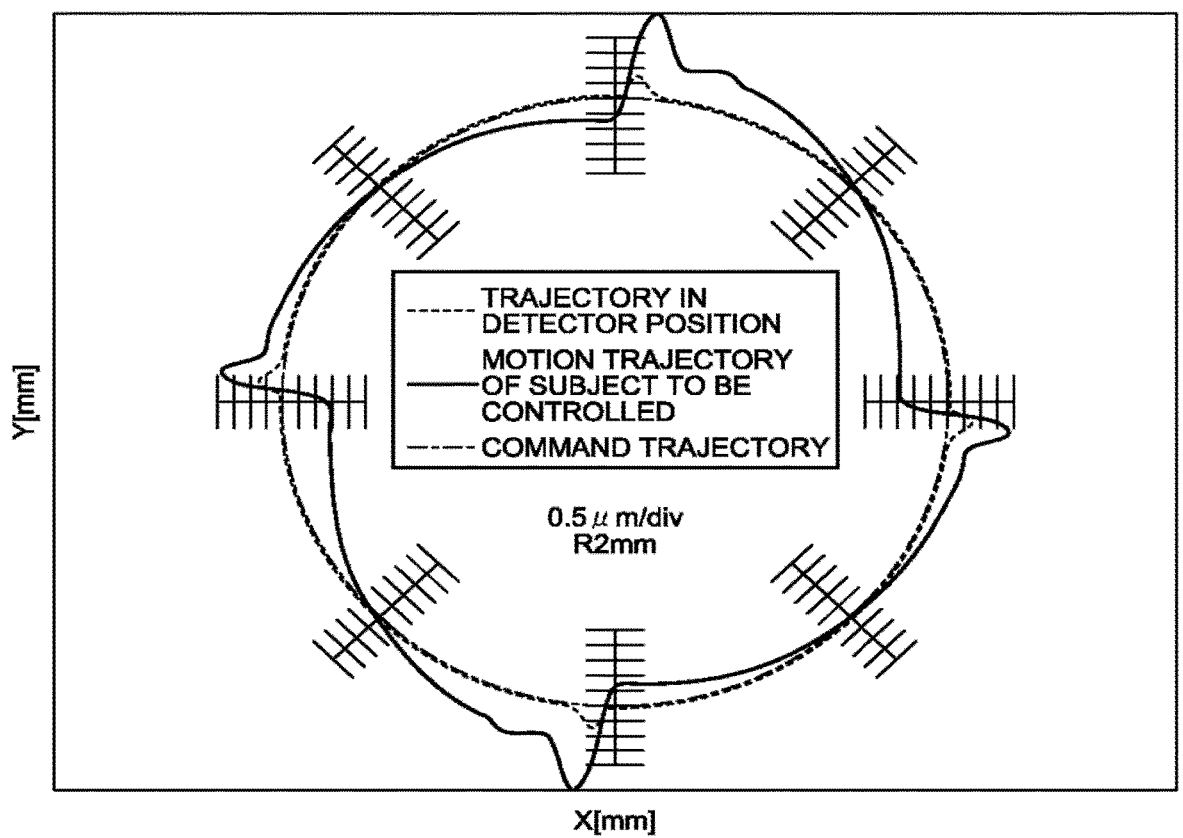
FIG. 5 is a diagram in which an operation trajectory in detector positions, a motion trajectory of a subject to be controlled, and a command trajectory provided during an arc motion are plotted on an xy plane.

FIG. 5 is a diagram in which an operation trajectory in detector positions, a motion trajectory of a subject controlled, and a command trajectory provided during an arc motion are plotted on the xy plane. The detector positions represent the feedback position $Pd_x$ and the feedback position $Pd_y$ described above. In FIG. 5, the operation trajectory in the detector positions is indicated by a dotted line, the motion trajectory of the subject controlled is indicated by a solid line, and the command trajectory provided during the arc motion is indicated by an alternate long and short dash line. In FIG. 5, a trajectory error is magnified by 400 times in the radial direction. While the command trajectory is circular, the motion trajectory in the detector positions and the motion trajectory of the workpiece 17, which is the subject controlled, exhibit protrusion-like error patterns at quadrant-switching positions.

The motion trajectory in the detector positions, which protrudes outward of the circle at the quadrant-switching positions, is called a stick motion. It has been clarified that a stick motion is caused by a delay in feedback control due to the reversal of the direction in which friction is applied.

The motion trajectory of the subject controlled exhibits a trajectory that protrudes outward at the quadrant-switching positions and sinks inwardly after a delay. This is a phenomenon called a lost motion, which is caused by a delay in response of the subject controlled due to the presence of the mechanical elements, such as the feed screw 2x and the nut 9x, in addition to the stick motion caused by friction described above.

To inhibit trajectory errors caused by such a lost motion, the position command generation units 11x and 11y or the motor drive units 12x and 12y need to add a correction command such that a lost motion that occurs is cancelled. To do so, it is necessary to measure the motion trajectory of the workpiece 17 accurately.

As illustrated in FIGS. 1 and 3, the three-axis acceleration sensor 13 is installed near the workpiece 17 on the work table 4 of the numerical control machine tool 99 that uses the machine motion trajectory measuring apparatus 100 according to the present embodiment. An acceleration component $a_x$ in the x-axis direction, which is measured by the three-axis acceleration sensor 13, an acceleration component $a_y$ in the y-axis direction, which is measured by the three-axis acceleration sensor 13, the feedback position $Pd_x$, which is the detector position of the x-axis motor 1x, and the feedback position $Pd_y$, which is the detector position of the y-axis motor 1y, are input to the machine motion trajectory measuring apparatus 100. It is known that a motion error caused by friction is terminated in a movable plane; thus, an acceleration component in the z-axis direction can be ignored for adjusting parameters related to friction correction. The acceleration component $a_x$ and the acceleration component $a_y$ may be hereinafter referred to simply as acceleration sensor signals. The feedback positions $Pd_x$ and $Pd_y$ may be referred to as detector positions.

The machine motion trajectory measuring apparatus 100 illustrated in FIG. 3 includes a sensor signal separation unit 30, which separates each of the acceleration component $a_x$ in the x-axis direction and the acceleration component $a_y$ in the y-axis direction into two or more frequency bands; and a motor signal separation unit 31, which is a detection position signal separation unit that separates each of the feedback positions $Pd_x$ and $Pd_y$ into two or more frequency bands identical to the frequency bands of the sensor signal separation unit 30.

The machine motion trajectory measuring apparatus 100 also includes a data calibration unit 32, which calibrates the acceleration components $a_x$ and $a_y$ with the feedback positions $Pd_x$ and $Pd_y$ used as reference signals for each of the frequency bands separated by the sensor signal separation unit 30 and the motor signal separation unit 31, calculates a position response in each of the frequency bands, and outputs the calculation results; and a motion trajectory calculation unit 33, which adds together the position response in each of the frequency bands calculated by the data calibration unit 32, calculates a motion trajectory of the workpiece 17 during an operation in the x axis and the y axis, and outputs the calculation result as information indicative of the motion trajectory.

The information indicative of the operation trajectory calculated by the motion trajectory calculation unit 33 is output to a trajectory display apparatus 35, which is a motion trajectory display unit and is connected to the machine motion trajectory measuring apparatus 100. The trajectory display apparatus 35 is a display represented by a video monitor, and the operation trajectory calculated by the motion trajectory calculation unit 33 is indicated in a screen of the display. The operation trajectory is presented to an experimenter in this manner. Here, the trajectory display apparatus 35 may receive the motion trajectory in the feedback positions $Pd_x$ and $Pd_y$ and the command trajectory and display the measurement results of the command trajectory and the motion trajectory in the multiple positions in a superimposed manner as illustrated in FIG. 5.

A method of measuring a motion trajectory from an acceleration sensor signal will be described below. Measuring a motion trajectory when an arc trajectory motion is repeated on the xy plane with a radius of 2 mm and a feeding speed of 500 mm/min will be considered here. The motion trajectory of the workpiece 17 is measured by the three-axis acceleration sensor 13 placed on the work table 4. Here, by performing second order integration on the acceleration component $a_x$ measured by the three-axis acceleration sensor 13, an amount of displacement Px, which is a motion trajectory in the installation position of the three-axis acceleration sensor 13, can be calculated.

When data of the acceleration component $a_x$ is acquired by discrete sampling, a speed Vx can be calculated from a sequence represented by equation (1) below using the acceleration component $a_x$ and a sampling time dt. Furthermore, the amount of displacement Px is calculated from a sequence represented by equation (2) below using the speed Vx and the sampling time dt. Note that the initial values of the speed Vx and the amount of displacement Px are zero. Because an amount of displacement Py for the y axis can be calculated from the acceleration in a similar manner, a motion trajectory can be calculated from the amounts of displacement Px and Py.

[Equation 1]

$$V_x(n+1)=V_x(n)+dt*(a_x(n)+a_x(n+1))/2 \quad (1)$$

[Equation 2]

$$P_x(n+1)=P_x(n)+dt*(V_x(n)+V_x(n+1))/2 \quad (2)$$

Figure 6:
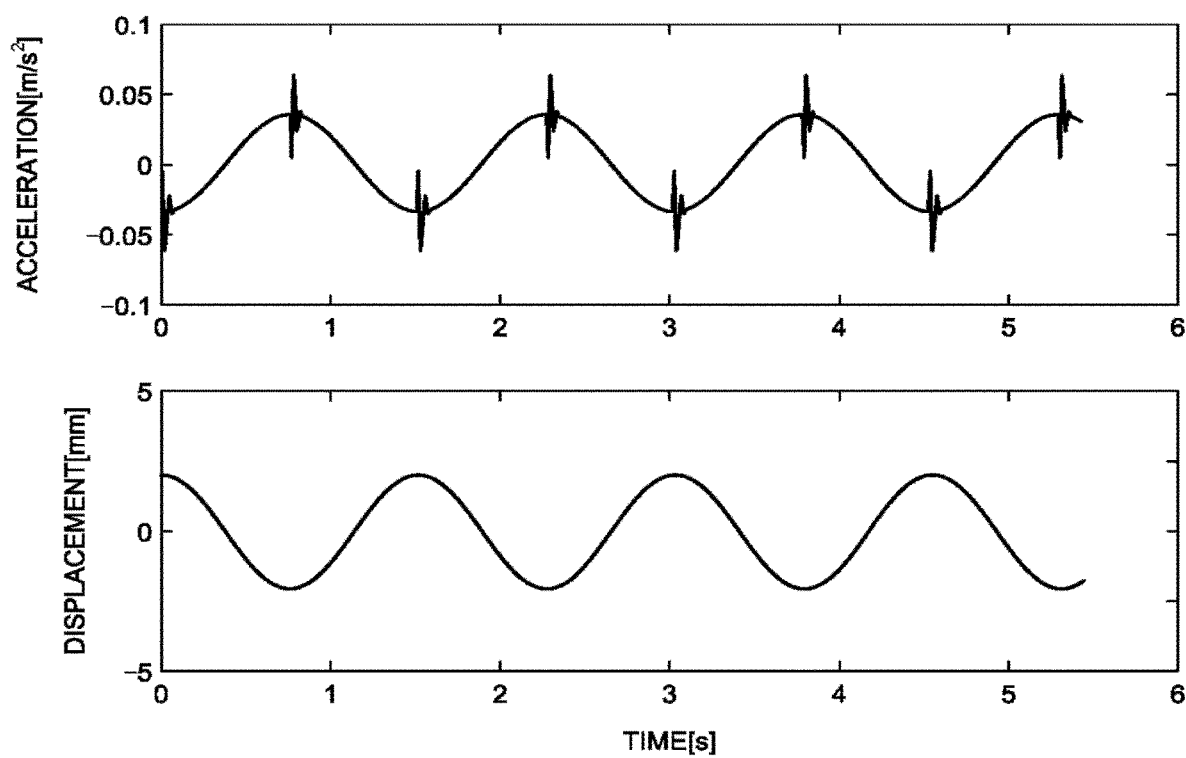
FIG. 6 is a diagram illustrating an acceleration waveform in the x-axis direction when no noise is present and the amount of displacement in the x-axis direction calculated from the acceleration.

FIG. 6 is a diagram illustrating an acceleration waveform in the x-axis direction when no noise is present and the amount of displacement in the x-axis direction calculated from the acceleration. In the upper portion of the diagram on the drawing plane, the horizontal axis represents time and the vertical axis represents the acceleration. In the lower portion of the diagram on the drawing plane, the horizontal axis represents the time and the vertical axis represents the amount of displacement. The waveforms of the acceleration and the amount of displacement illustrated in FIG. 6 are provided when the acceleration sampling time dt is 1 ms.

Figure 7:
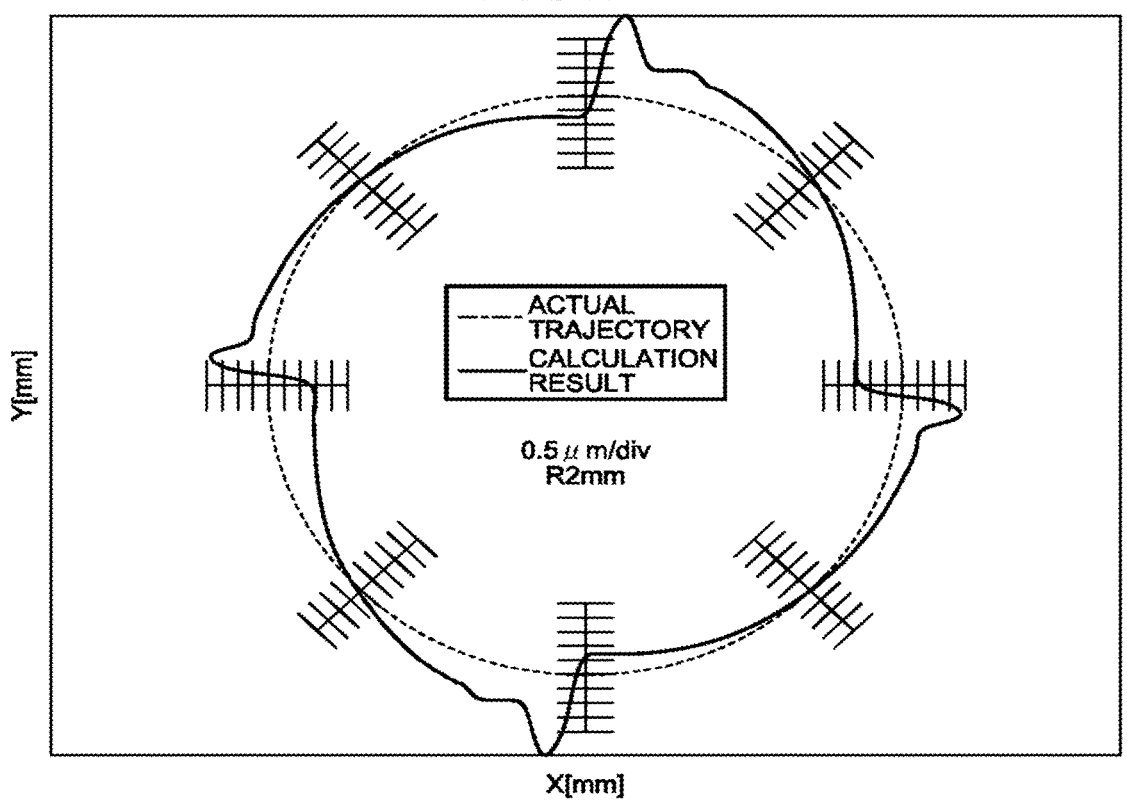
FIG. 7 is a diagram illustrating the result of calculation of trajectory errors on the xy plane under a condition similar to the condition in FIG. 6.

FIG. 7 is a diagram illustrating the result of calculation of the trajectory errors on the xy plane under a condition similar to the condition in FIG. 6. In FIG. 7, an actual trajectory, which is an actual operation trajectory, is indicated by an alternate long and short dash line, and the calculation result of the trajectory errors resulting from the calculation performed using equations (1) and (2) described above is indicated by a solid line. In an ideal situation where no noise is present, the actual trajectory agrees with the calculation result; thus, the actual trajectory indicated by the alternate long and short dash line is overlaid on the calculation result indicated by the solid line in FIG. 7. A motion trajectory can be obtained from the acceleration with simple calculation under such an ideal condition where no noise is present.

In contrast, in an actual measuring environment, various noise components are superimposed on the acceleration sensor signals measured by the three-axis acceleration sensor 13 due to the effect of electromagnetic noise, quantization error, or the effect of aliasing. All signal components other than the acceleration components the motion trajectory are referred to as the noise and are not strictly distinguished from one another. Because it is difficult to observe a true acceleration component of a motion trajectory that is completely rid of noise in reality, an ideal acceleration sensor signal is generated using simulation in FIG. 6.

Figure 8:
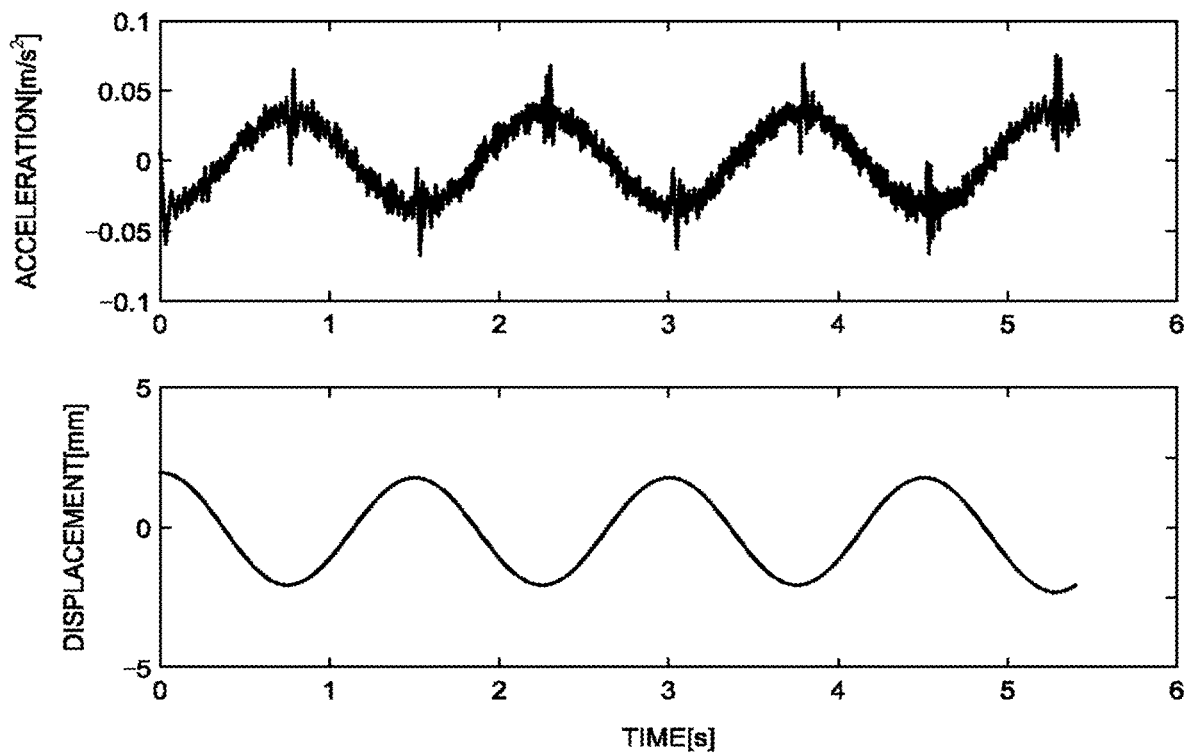
FIG. 8 is a diagram illustrating an acceleration waveform in the x-axis direction when noise is present and the amount of displacement in the x-axis direction calculated from the acceleration.

FIG. 8 is a diagram illustrating an acceleration waveform in the x-axis direction when noise is present and the amount of displacement in the x-axis direction calculated from the acceleration. In the upper portion of the diagram on the drawing plane, the horizontal axis represents time and the vertical axis represents the acceleration. In the lower portion of the diagram on the drawing plane, the horizontal axis represents the time and the vertical axis represents e amount of displacement.

Figure 9:
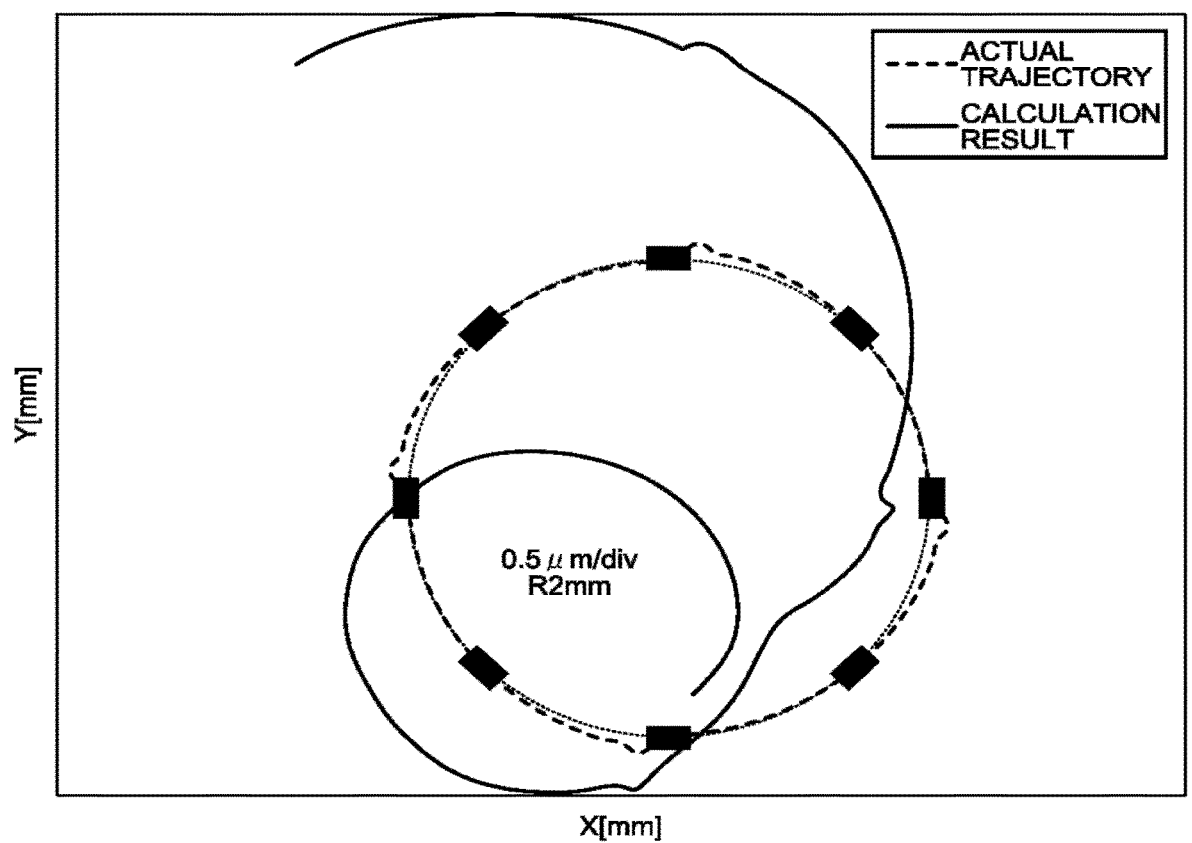
FIG. 9 is a diagram illustrating the result of calculation of trajectory errors on the xy plane under a condition similar to the condition in FIG. 8.

FIG. 9 is a diagram illustrating the result of calculation of the trajectory errors on the xy plane under a condition similar to the condition in FIG. 8. In FIG. 9, an actual trajectory, which is an actual operation trajectory, is indicated by a dotted line, and the calculation result of the trajectory errors is indicated by a solid line. FIG. 9 indicates that the trajectory error obtained from the calculation does not agree with the actual trajectory. Such a calculation error resulting from an integration operation is referred to as an integration error. When a displacement is obtained by integration of acceleration without compensating the effect of such an integration error of the acceleration, it is difficult to achieve the accuracy required for the motion trajectory measurement for a machine represented by the numerical control machine tool 99.

In the machine motion trajectory measuring apparatus 100 according to the present embodiment, the sensor signal separation unit 30 and the motor signal separation unit 31 perform separation into frequency bands and the data calibration unit 32 reduces an integration error by using an acceleration sensor signal in each of the frequency bands. The configurations of the sensor signal separation unit 30, the motor signal separation unit 31, and the data calibration unit 32 will be described specifically below.

Figure 10:
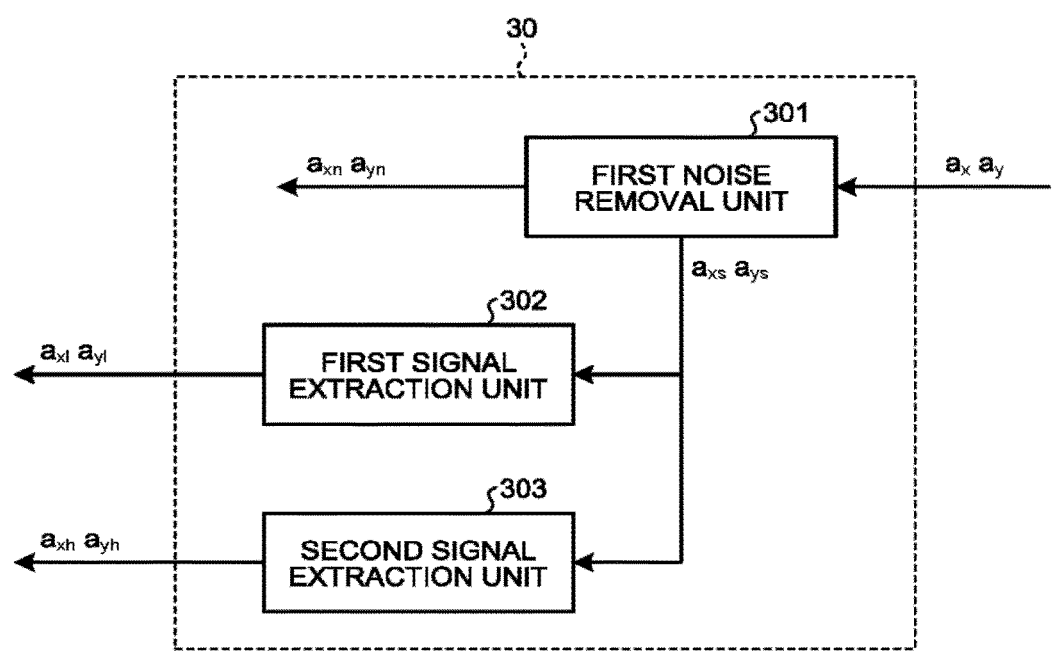
FIG. 10 is a configuration diagram of a sensor signal separation unit illustrated in FIG. 3.

FIG. 10 is a configuration diagram of the sensor signal separation unit illustrated in FIG. 3. In order to remove noise components from the acceleration components $a_x$ and $a_y$, which are the acceleration sensor signals, the sensor signal separation unit 30 separates a noise band from each of the acceleration sensor signals. The noise band is a noise component of each of the acceleration sensor signals. By removing the noise component, an error in the acceleration compensation can be reduced. Specifically, the sensor signal separation unit 30 includes a first noise removal unit 301, which removes noise components $a_{xn}$ and $a_{yn}$ from the acceleration components $a_x$ and $a_y$, respectively, in order to separate and output signal components $a_{xs}$ and $a_{ys}$, which are components other than the noise components $a_{xn}$ and $a_{yn}$; a first signal extraction unit 302, which extracts low frequency band components $a_{xl}$ and $a_{yl}$ from the signal components $a_{xs}$ and $a_{ys}$, respectively; and a second signal extraction unit 303, which extracts high frequency band components $a_{xh}$, and $a_{yh}$ from the signal components $a_{xs}$ and $a_{ys}$, respectively.

The acceleration components $a_x$ and $a_y$ are input to the sensor signal separation unit 30, and the noise components $a_{xn}$ and $a_{yn}$ are separated from the acceleration components $a_x$ and $a_y$, respectively, by the first noise removal unit 301. The signal components $a_{xs}$ and $a_{ys}$, which are components other than the noise components $a_{xn}$ and $a_{yn}$, are extracted in this manner. The first noise removal unit 301 is implemented in the sensor signal separation unit 30 as a low-pass filter that is described by a transfer function $G_{filt}$ represented by equation (3) below. In equation (3) below, $T_{filt}$ represents a cutoff time constant for the low-pass filter. A signal at a low band side can be separated efficiently by using a low-pass filter.

[Equation 3]

$$G_{filt}(s) = \frac{1}{T_{filt}s + 1} \quad (3)$$

The signal components $a_{xs}$ and $a_{ys}$, which are output by the first noise removal unit 301, are separated into the low frequency band components $a_{xl}$ and $a_{yl}$ and the high frequency band components $a_{xh}$ and $a_{yh}$, respectively, by the first signal extraction unit 302 and the second signal extraction unit 303.

The first signal extraction unit 302 is a low-pass filter that is described by a transfer function G1 represented by equation (4) below. In equation (4) below, $T_{cutoff}$ represents a cutoff time constant. In order to remove the noise components effectively, it is desirable that $T_{filt} < T_{cutoff}$.

[Equation 4]

$$Gl(s) = \frac{1}{T_{cutoff}s + 1} \quad (4)$$

The second signal extraction unit 303 is a high-pass filter that is described by a transfer function Gh represented by equation (5) below.

[Equation 5]

$$Gh(s) = \frac{T_{cutoff}s}{T_{cutoff}s + 1} \quad (5)$$

Here, designing each of the filters such that the sum of the transfer function of the first signal extraction unit 302 and the transfer function of the second signal extraction unit 303 is one enables extraction from the signal components $a_{xs}$ and $a_{ys}$ without excess or deficiency. That is, in order to prevent excess or deficiency of the signal before and after the frequency separation, it is necessary to design each of the filters so as to satisfy the relation in equation (6) described below. That is, the sensor signal separation unit 30 includes a high frequency band filter that is designed such that the sum of a transfer function of a low frequency band filter and that of the high frequency band filter is one. The high frequency hand is a vibration frequency component of the machine apparatus that drives each of the actuators. Causing the sum of the transfer functions to be one eliminates a band in which a signal is lost or amplified before and after the frequency separation is performed.

[Equation 6]

$$Gl(s) + Gh(s) = 1 \quad (6)$$

Figure 11:
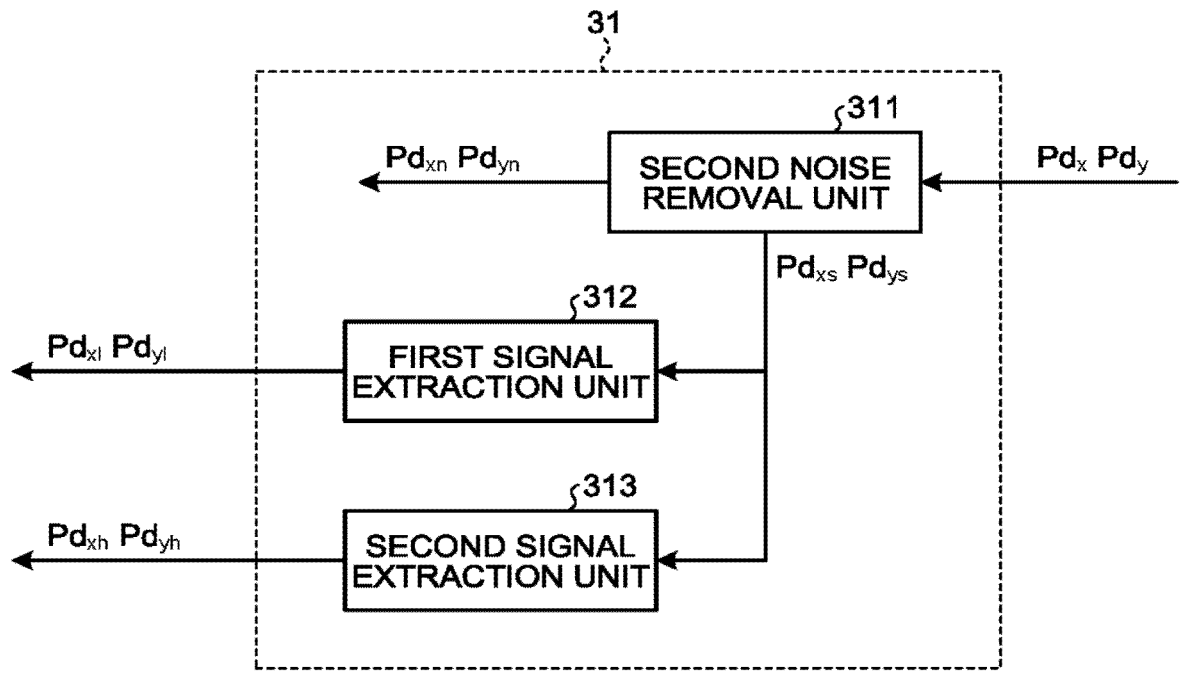
FIG. 11 is a configuration diagram of a motor signal separation unit illustrated in FIG. 3.

FIG. 11 is a configuration diagram of the motor signal separation unit illustrated in FIG. 3. The motor signal separation unit 31 includes a second noise removal unit 311, which removes noise components $Pd_{xn}$ and $Pd_{yn}$ from the feedback positions $Fd_x$ and $Fd_y$, respectively, in order to separate and output signal components $Pd_{xs}$ and $Pd_{ys}$, which are components other than the noise components $Pd_{xn}$ and $Pd_{yn}$; a first signal extraction unit 312, which extracts low frequency band components $Pd_{xl}$ and $Pd_{yl}$ from the signal components $Pd_{xs}$ and $Pd_{ys}$, respectively; and a second signal extraction unit 313, which extracts high frequency band components $Pd_{xh}$ and $Pd_{yh}$ from the signal components $Pd_{xs}$ and $Pd_{ys}$, respectively.

The transfer functions of the second noise removal unit 311, the first signal extraction unit 312, and the second signal extraction unit 313 are equal to the transfer function $G_{filt}$ represented by equation (3) described above, the transfer function G1 represented by equation (4) described above, and the transfer function Gh represented by equation (5) described above, respectively.

Figure 12:
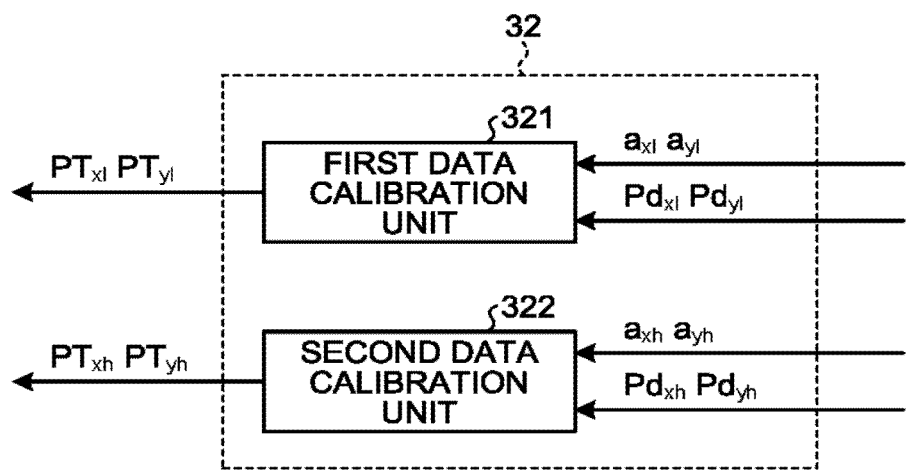
FIG. 12 is a configuration diagram of a data calibration unit illustrated in FIG. 3.

FIG. 12 is a configuration diagram of the data calibration unit illustrated in FIG. 3. The data calibration unit 32 includes a first data calibration unit 321, which calculates low frequency band components $PT_{xl}$ and $PT_{yl}$ of a motion trajectory by using the low frequency band components $a_{xl}$ and $a_{yl}$, which are separated by the sensor signal separation unit 30 illustrated in FIG. 10, and the low frequency band components $Pd_{xl}$ and $Pd_{yl}$, which are separated by the motor signal separation unit 31 illustrated in FIG. 11; and a second data calibration unit 322, which calculates high frequency band components $PT_{xh}$ and $PT_{yh}$ of the motion trajectory by using the high frequency band components $a_{xh}$ and $a_{yh}$, which are separated by the sensor signal separation unit 30 illustrated in FIG. 10, and the high frequency band components $Pd_{xh}$ and $Pd_{yh}$, which are separated by the motor signal separation unit 31 illustrated in FIG. 11.

Differences between amounts of displacement Pxl and Pyl, which are calculated by performing numerical integration on the acceleration low frequency band components $a_{xl}$ and $a_{yl}$, respectively, and the low frequency band components $Pd_{xl}$ and $Pd_{yl}$ are integration errors; thus, when the first data calibration unit 321 calculates the low frequency band components $PT_{xl}$ and $PT_{yl}$, compensating these differences enables reduction in the integration errors Methods of compensating the integration errors include a method in which the low frequency band components $PT_{xl}$ and $PT_{yl}$ are calculated by approximating the integration errors with a polynomial and subtracting the approximated integration errors from the amounts of displacement Pxl and Pyl, respectively. When the integration error waveforms are approximated, an unknown parameter of an approximate expression may be determined by a least-squares method or a numerical solution such as a downhill simplex method may be used.

As the method of compensating the integration errors in the second data calibration unit 322, a method of compensating the integration errors in the low frequency band may be used. The low frequency band is a control band of the machine apparatus that drives each of the actuators. The integration errors are known to be caused in a low order; thus, the second data calibration unit 322 may be configured to allow the high frequency band components $Pd_{xh}$ and $Pd_{yh}$, which are calculated by numerical integration, to pass through a high-pass filter that removes a low frequency band component and output the results as the high frequency hand components $PT_{xh}$ and $PT_{yh}$.

The low frequency band components $PT_{xl}$ and $PT_{yl}$ and the high frequency band components $PT_{xh}$ and $PT_{yh}$, which are calculated by the data calibration unit 32, are input to the motion trajectory calculation unit 33 illustrated in FIG. 3.

Figure 13:
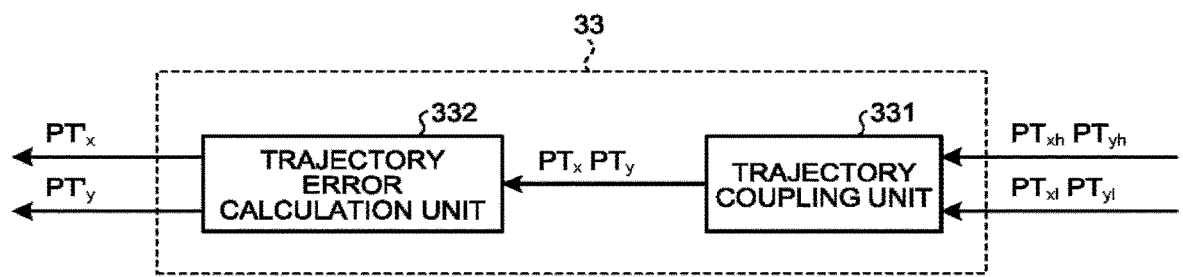
FIG. 13 is a configuration diagram of a motion trajectory calculation unit illustrated in FIG. 3.

FIG. 13 is a configuration diagram of the motion trajectory calculation unit illustrated in FIG. 3. The motion trajectory calculation unit 33 includes a trajectory coupling unit 331 and a trajectory error calculation unit 332. The trajectory coupling unit 331 couples the low frequency band components $PT_{xl}$ and $PT_{yl}$ and the high frequency band components $PT_{xh}$ and $PT_{yh}$ of the motion trajectory, which are calculated by the data calibration unit 32 illustrated in FIG. 12. That is, the trajectory coupling unit 331 calculates an x-axis direction component $PT_x$ of the motion trajectory in the installation position of the three-axis acceleration sensor 13 on the basis of equation (7) described below and calculates a y-axis direction component $PT_y$ of the motion trajectory in the installation position of the three-axis acceleration sensor 13 on the basis of equation (8) described below.

[Equation 7]

$$PT_x = PT_{xl} + PT_{xh} \tag{7}$$

[Equation 8]

$$PT_y = PT_{yl} + PT_{yh} \tag{8}$$

The trajectory error calculation unit 332 calculates an x-axis direction trajectory error $PT'_x$ and a y-axis direction trajectory error $PT'_y$ on the basis of the x-axis direction component $PT_x$ and the y-axis direction component $PT_y$, which are calculated by the trajectory coupling unit 331, and outputs the results. As the method of displaying trajectory errors of an arc motion, a method is known in which a trajectory error is magnified in the radial direction as described in equations (9) and (10) below and displayed. In equations (9) and (10) described below, Rcom represents a command radius and MAG represents a magnification and display power of the trajectory error.

[Equation 9]

$$PT'_x = \{Rcom + MAG(\sqrt{PT_x^2 + PT_y^2} - Rcom)\}\cos\left(\tan^{-1}\left(\frac{PT_x}{PT_y}\right)\right) \tag{9}$$

[Equation 10]

$$PT'_y = \{Rcom + MAG(\sqrt{PT_x^2 + PT_y^2} - Rcom)\}\sin\left(\tan^{-1}\left(\frac{PT_x}{PT_y}\right)\right) \tag{10}$$

Figure 14:
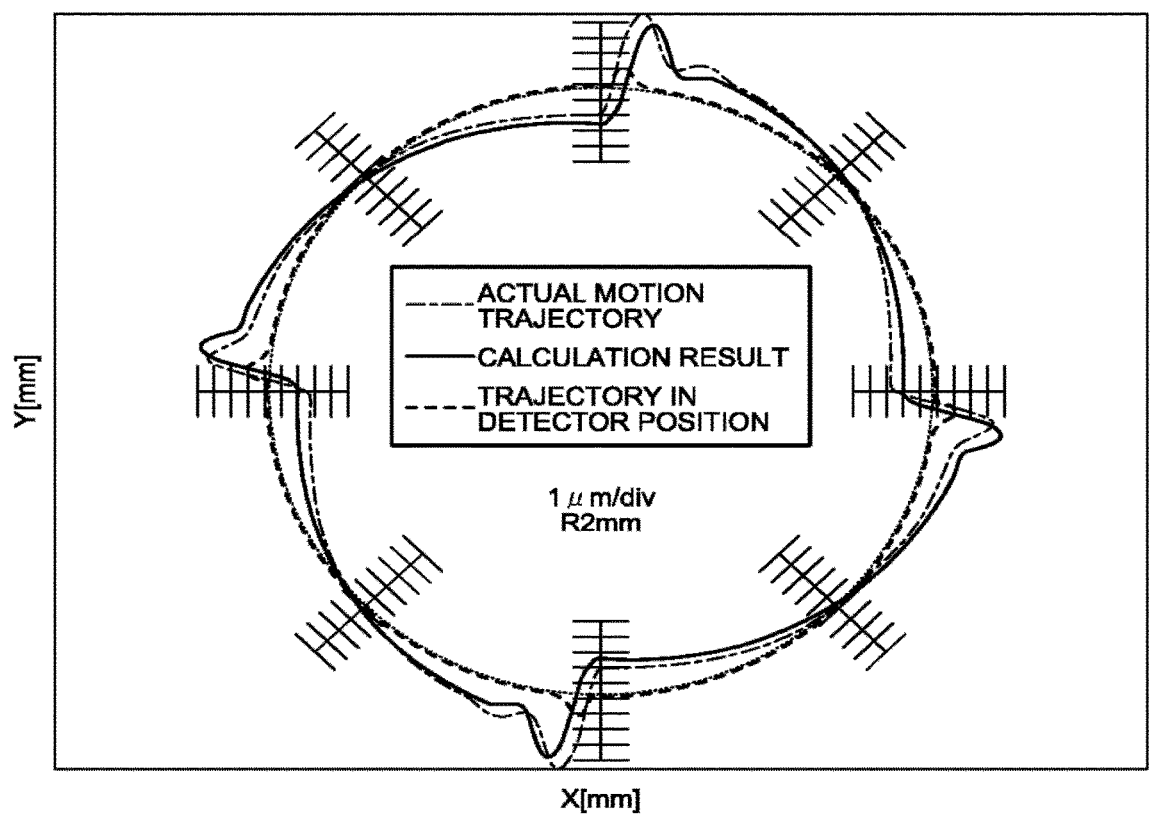
FIG. 14 is a diagram illustrating, in comparison, an actual motion trajectory, the calculation result of trajectory error calculated by the machine motion trajectory measuring apparatus according to the first embodiment, and an operation trajectory in the detector position.

FIG. 14 is a diagram illustrating, in comparison, an actual motion trajectory, the calculation result of a trajectory error calculated by the machine motion trajectory measuring apparatus according to the first embodiment, and an operation trajectory in the detector position. In FIG. 14, the actual motion trajectory is indicated by an alternate long and short dash line, the calculation result of the trajectory errors is indicated by a solid line, and the operation trajectory in the detector position is indicated by a dotted line. As illustrated in FIG. 14, by using the machine motion trajectory measuring apparatus 100 according to the first embodiment, a motion trajectory the workpiece 17 can be calculated with an accuracy of one micrometer.

As described above, the machine motion trajectory measuring apparatus 100 according to the first embodiment enables highly accurate measurement of a trajectory error in any motion trajectory with a simple set-up by separating each of the acceleration sensor signal and the detection position signal into two or more bands for calibration.

Additionally, the data calibration unit according to the first embodiment is configured to, when a calculation error in a motion trajectory component is corrected in each of the frequency bands from the acceleration sensor signal separated by the sensor signal separation unit, use the detection position signal in each of the frequency bands separated by the detection position signal separation unit. By using the detection position signal as a reference signal, the calculation error can be corrected effectively.

Additionally, the data calibration unit according to the first embodiment is configured to, when data calibration is performed, perform second order integration on an acceleration input signal and correct an integration error such that the mean value of the integration result is zero. When a reference position is not moved, it is satisfactory if the integration error be corrected such that the mean value of the integration result is zero; thus, the integration error can be compensated with ease.

Furthermore, the data calibration unit according to the first embodiment is configured to, when data calibration in a high frequency band is performed, cuff a low frequency component that is unable to pass through the high-pass filter, which is used in the sensor signal separation unit, from a signal output as the integration result, and output the result. By cutting the low frequency component generated due to the integration error and outputting the result, an integration error component can be removed.

Moreover, the data calibration unit according to the first embodiment is configured to, when data calibration in a low frequency band is performed, correct an error such that the difference between the result of the second order integration performed on an acceleration sensor signal, which is separated by the sensor signal separation unit, and a low frequency band component of a detection position signal does not exceed a tolerance value and calculate a motion trajectory of a subject in the low frequency band. By correcting the integration error after the second order integration, an error component can be eliminated from the final result.

Moreover, the machine motion trajectory measuring apparatus 100 according to the first embodiment includes a motion trajectory display unit that displays a motion trajectory of a machine apparatus, and the motion trajectory display unit synthesizes a target trajectory from a target position that is input to the position command generation unit, synthesizes a command trajectory from a command position that is output from the position command generation unit, synthesizes a detector trajectory from the detection position signal, and displays, on the motion trajectory display unit, one of the target trajectory, the command trajectory, and the detector trajectory, as superimposed on a motion trajectory of the machine apparatus. By including the display apparatus, intuitive presentation of the measurement result can be provided for an operator.

Second Embodiment

Figure 15:
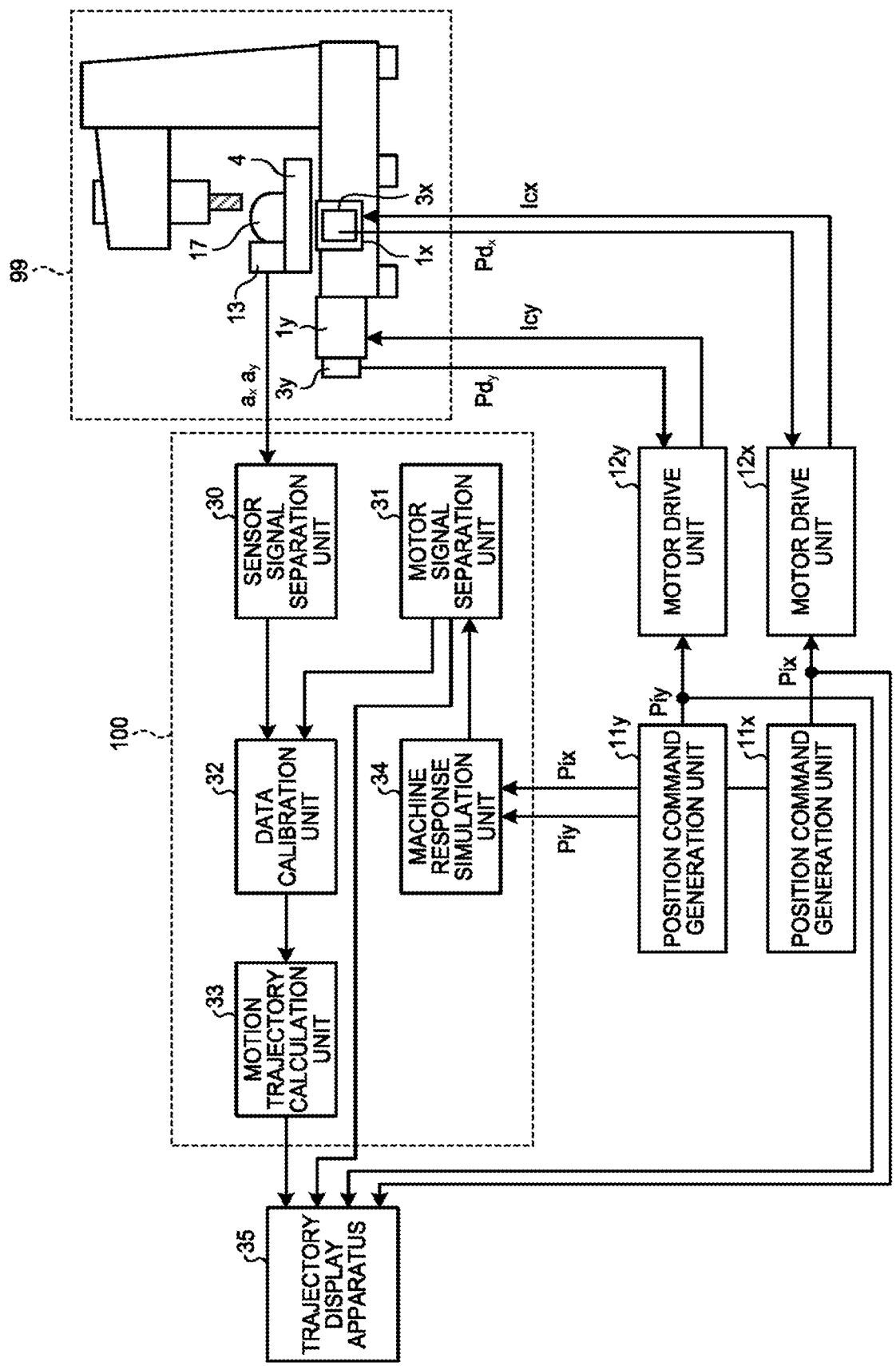
FIG. 15 is a diagram illustrating a machine motion trajectory measuring apparatus according to a second embodiment, a numerical control machine tool that uses the machine motion trajectory measuring apparatus according to the second embodiment, and a servo control apparatus.

FIG. 15 is a diagram illustrating a machine motion trajectory measuring apparatus according to a second embodiment, a numerical control machine tool that uses the machine motion trajectory measuring apparatus according to the second embodiment, and a servo control apparatus. The first embodiment and the second embodiment are different from each other in the points described below. Note that components identical with the components in the first embodiment are designated with the identical symbols and their description is omitted; different components only will be described hereinafter.

(1) The machine motion trajectory measuring apparatus 100 according to the second embodiment includes a machine response simulation unit 34, in addition to the sensor signal separation unit 30, the motor signal separation unit 31, the data calibration unit 32, and the motion trajectory calculation unit 33.

(2) In place of the feedback position $Pd_x$ of the x-axis motor $1x$ and the feedback position $Pd_y$ of the y-axis motor $1y$, the position command Pix, which is generated by the position command generation unit $11x$, and the position command Piy, which is generated by the position command generation unit $11y$, are input to the machine motion trajectory measuring apparatus 100 according to the second embodiment.

(3) The data calibration unit 32 of the machine motion trajectory measuring apparatus 100 according to the second embodiment calibrates the acceleration components $a_x$ and $a_y$ with a feedback position Pm that is calculated by the machine response simulation unit 34 as a reference signal and calculates a position response in each of the frequency bands.

Figure 16:
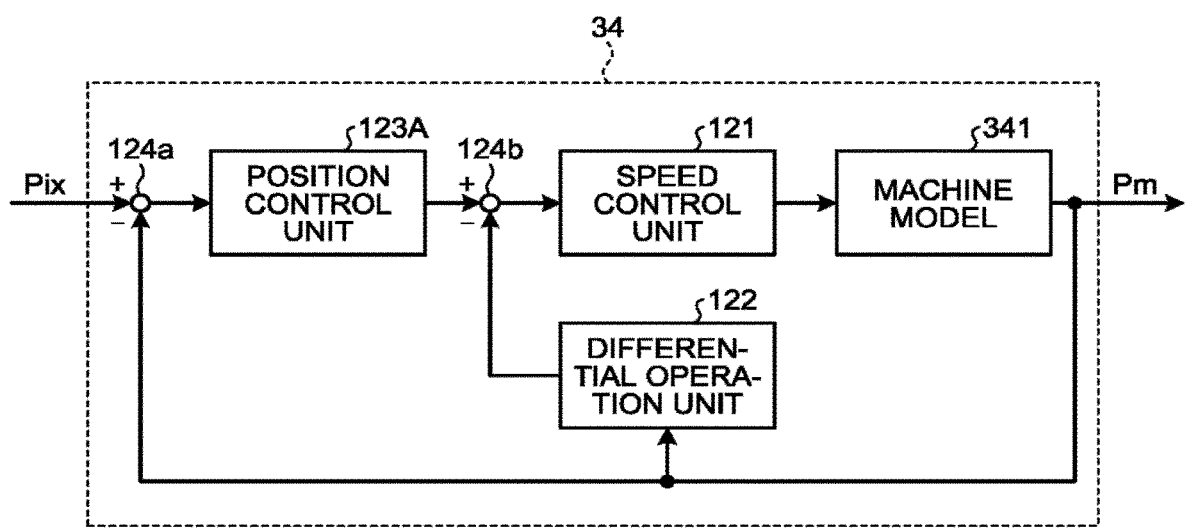
FIG. 16 is a configuration diagram of a machine response simulation unit illustrated in FIG. 15.

FIG. 16 is a configuration diagram of the machine response simulation unit illustrated in FIG. 15. The machine response simulation unit 34 includes a position control unit 123A, which is configured similarly to the position control unit 123 of the motor drive unit $12x$ illustrated in FIG. 15, the speed control unit 121, the differential operation unit 122, and a machine model 341.

Examples of the machine model 341 include a two-inertia model and a three-inertia model. A two-inertia model is a model that uses a two-inertia vibration system to approximate 1/J that is an inverse of load inertia J of an inertia model movable shaft or motor inertia and a driven body. A three-inertia model is a model that uses a three-inertia vibration system to approximate motor inertia, a driven body, and inertia of a feed screw. In FIG. 16, an example configuration of the machine response simulation unit 34 that uses the position command Pix to generate the feedback position Pm is illustrated, whereas the machine response simulation unit 34 that uses the position command Piy to generate the feedback position Pm is configured similarly, in which case, its position control unit 123A is configured similarly to the position control unit 123 of the motor drive unit $12y$ illustrated in FIG. 15.

The machine motion trajectory measuring apparatus 100 according to the second embodiment uses the feedback position Pm, which is calculated by the machine model 341, as a reference signal; thus, even when a feedback position output from each of the rotary angle detectors $3x$ and $3y$ cannot be used as the reference signal because of low resolving powers of the rotary angle detectors $3x$ and $3y$, the feedback position calculated by the machine model 341 can be used as the reference signal. Additionally, the machine motion trajectory measuring apparatus 100 according to the second embodiment virtually calculates a driven body position in each of the motor drive units $12x$ and $12y$ of the semi-closed loop control; therefore, the calculated driven body position can be used as a reference signal.

Third Embodiment

The first embodiment and a third embodiment are different from each other in that, in the machine motion trajectory measuring apparatus 100 according to the third embodiment, a filter of the first signal extraction unit 302 illustrated in FIG. 10 simulates a response of a position control system of each of the motor drive units $12x$ and $12y$. With the transfer function of the position control unit 123 illustrated in FIG. 4 being Gp(s), a response of the position control system can be approximated as equation (11) below. A simple example of the position control unit 123 is a proportional controller represented by equation (12) below.

[Equation 11]

$$Gl(s) = \frac{Gp(s)}{s + Gp(s)} \qquad (11)$$

[Equation 12]

$$Gp(s) = Kpp \qquad (12)$$

In order to prevent excess or deficiency of the signal before and after the frequency separation in the sensor signal separation unit 30 illustrated in FIG. 10, the relationship between the first signal extraction unit 302 and the second signal extraction unit 303 needs to satisfy equation (6) described above; thus, it is satisfactory if the transfer function of the second signal extraction unit 303 be as in equation (13) described below.

[Equation 13]

$$Gh(s) = \frac{s}{s + Gp(s)} \qquad (13)$$

By using a model that simulates a response of the position control system for the low-pass filter in the first signal extraction unit 302, inclusion of a drive component in an acceleration component extracted by the second signal extraction unit 303 is prevented. Additionally, the high frequency band components $Pd_{xh}$ and $Pd_{yh}$ extracted by the second signal extraction unit 313 illustrated in FIG. 11 are zero; thus, the need to use the high frequency band components $Pd_{xh}$ and $Pd_{yh}$ when the data calibration is performed in the second data calibration unit 322 illustrated in FIG. 12 is eliminated. In this manner, the mean value of amounts of displacement Pxh and Pyh after the integration operation is zero; thus, error correction processing is simplified. Additionally, by causing the low-pass filter to agree with the transfer function of the position control system, a drive component included in a trajectory component, i.e., a component whose final signal value does not necessarily become zero when integration is performed for one cycle, can be extracted as a low frequency component.

Fourth Embodiment

Figure 17:
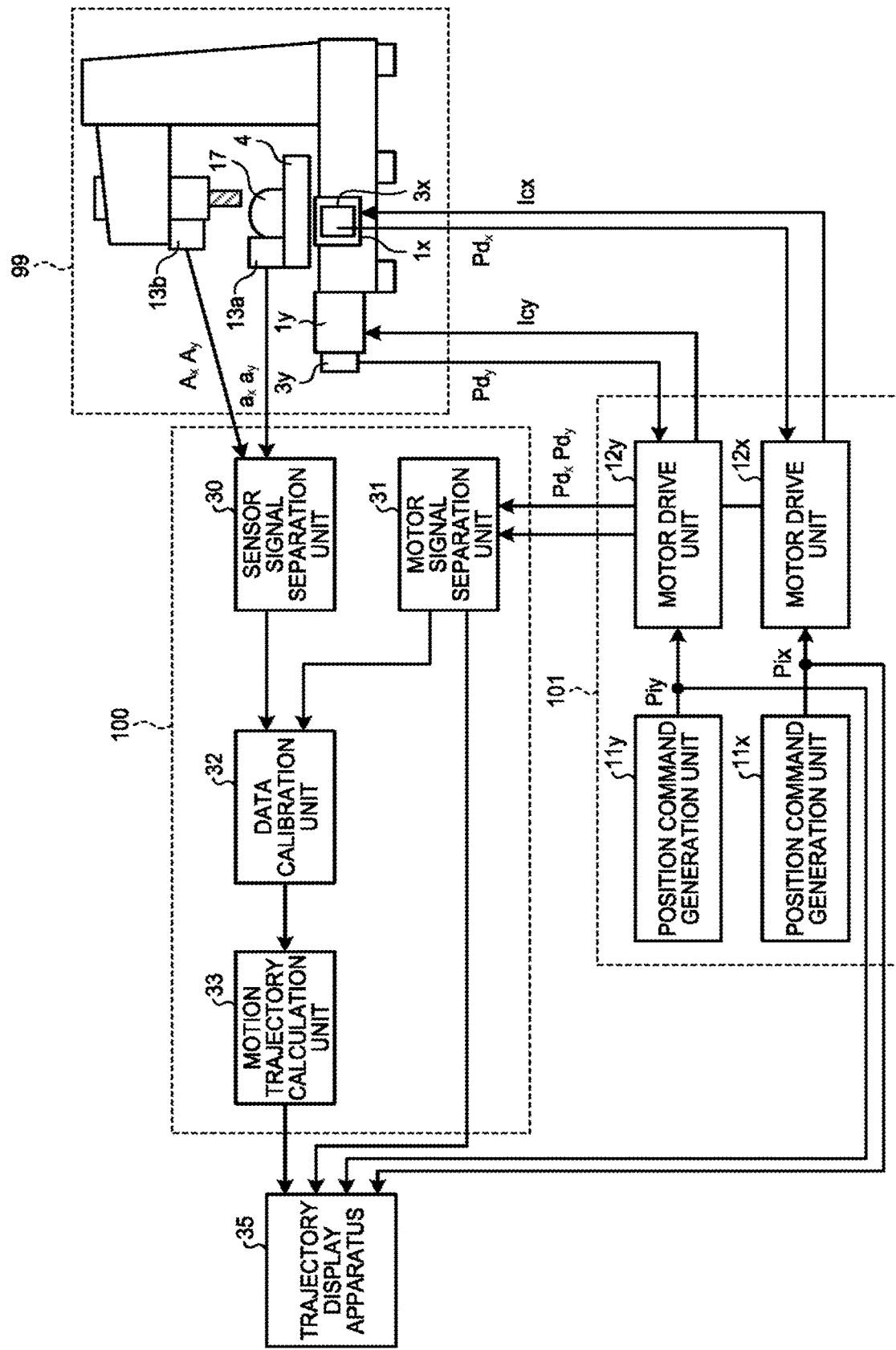
FIG. 17 is a diagram illustrating a machine motion trajectory measuring apparatus according to a fourth embodiment, a numerical control machine tool that uses the machine motion trajectory measuring apparatus according to the fourth embodiment, and a servo control apparatus.
Figure 18:
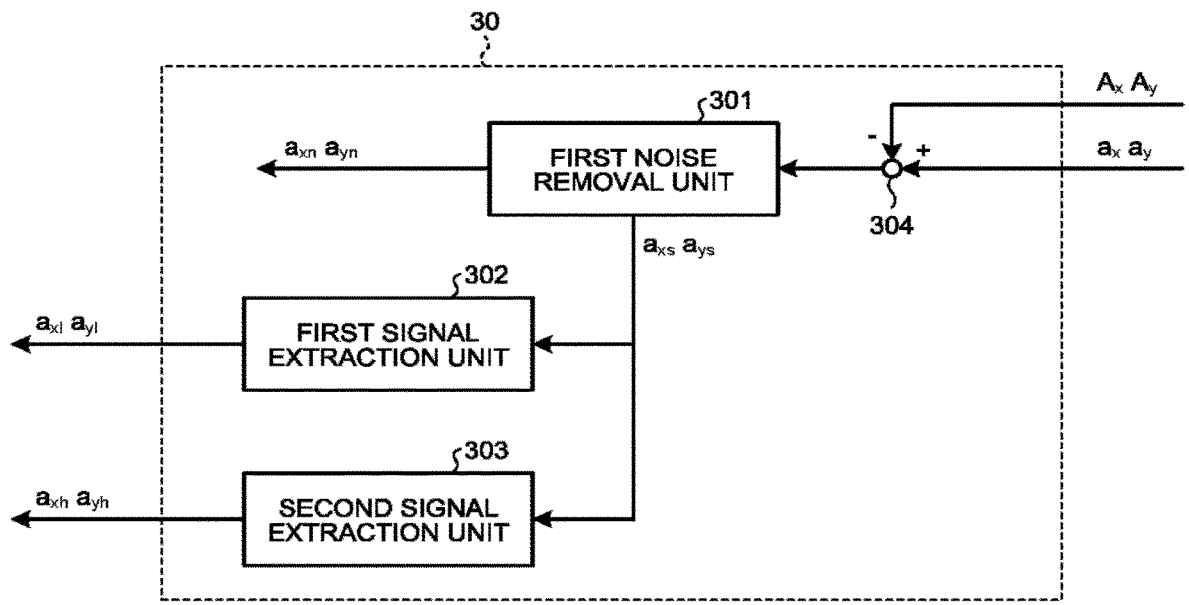
FIG. 18 is a configuration diagram of a sensor signal separation unit illustrated in FIG. 17.

FIG. 17 is a diagram illustrating a machine motion trajectory measuring apparatus according to a fourth embodiment, a numerical control machine tool that uses the machine motion trajectory measuring apparatus according to the fourth embodiment, and a servo control apparatus. FIG. 18 is a configuration diagram of a sensor signal separation unit illustrated in FIG. 17. The first embodiment and the fourth embodiment are different from each other in the points described below. Note that components identical with those in the first embodiment are designated with the identical symbols and their description is omitted; different components only will be described hereinafter.

(1) A motion trajectory to be measured by the machine motion trajectory measuring apparatus 100 according to the fourth embodiment is an assumed motion trajectory between the tool 16 and the workpiece 17.

(2) The numerical control machine tool 99 that uses the machine motion trajectory measuring apparatus 100 according to the fourth embodiment includes a subject acceleration sensor 13a and a reference acceleration sensor 13b. The subject acceleration sensor 13a is an acceleration sensor that is installed on the work table 4 near the workpiece 17 and corresponds to the three-axis acceleration sensor 13 in the first embodiment. The reference acceleration sensor 13b is installed on the column 5 near the tool 16.

(3) The machine motion trajectory measuring apparatus 100 according to the fourth embodiment uses an acceleration component $A_x$ and an acceleration component $A_y$ that are reference acceleration sensor signals measured by the reference acceleration sensor 13b, in addition to the acceleration component $a_x$ and the acceleration component $a_y$, which are measured by the subject acceleration sensor 13a.

In the actual numerical control machine tool 99, the driving reaction force of the work table 4 may cause a vibration in the column 5, and the vibration in the column 5 may cause a vibration in the tool 16. A vibration caused during machining of the workpiece 17 causes a machining error; thus, when a vibration is caused in the tool 16, it is necessary to measure a relative displacement between the tool 16 and the workpiece 17. In order to measure such a relative displacement, the machine motion trajectory measuring apparatus 100 according to the fourth embodiment uses the subject acceleration sensor 13a, which is installed on the work table 4 near the workpiece 17, and the reference acceleration sensor 13b, which is installed on the column 5 near the tool 16.

FIG. 18 is a configuration diagram of the sensor signal separation unit illustrated in FIG. 17. The sensor signal separation unit 30 of the first embodiment and the sensor signal separation unit 30 of the fourth embodiment are different from each other in that the censor signal separation unit 30 according to the fourth embodiment includes a relative acceleration calculation unit 304, in addition to the first noise removal unit 301, the first signal extraction unit 302, and the second signal extraction unit 303.

To calculate relative acceleration, the relative acceleration calculation unit 304 calculates the relative acceleration between the acceleration measured by the reference acceleration sensor 13b and the acceleration measured by the subject acceleration sensor 13a. That is, the relative acceleration calculation unit 304 obtains a relative acceleration component in the x-axis direction from the difference between the acceleration component $A_x$ measured by the reference acceleration sensor 13b and the acceleration component $a_x$ measured by the subject acceleration sensor 13a, and obtains a relative acceleration component in the y-axis direction from the difference between the acceleration component $A_y$ measured by the reference acceleration sensor 13b and the acceleration component $a_y$ measured by the subject acceleration sensor 13a. The relative acceleration calculated by the relative acceleration calculation unit 304 is input to the first noise removal unit 301.

The first noise removal unit 301 removes noise components $a_{xn}$ and $a_{yn}$ from the relative acceleration components in the x axis and the y axis calculated by the relative acceleration calculation unit 304, respectively, to separate and output signal components $a_{xs}$ and $a_{ys}$, which are components other than the noise components $a_{xn}$ and $a_{yn}$. The first signal extraction unit 302 extracts low frequency band components $a_{xl}$ and $a_{yl}$ from the signal components $a_{xs}$ and $a_{ys}$, respectively, and the second signal extraction unit 303 extracts high frequency band components $a_{xh}$ and $a_{yh}$ from the signal components $a_{xs}$ and $a_{ys}$, respectively. The fourth embodiment enables calculation of an amount of relative displacement from relative acceleration and thus enables measurement of a relative motion trajectory.

Fifth Embodiment

When the frequency of a machine vibration that occurs is less than the cutoff frequency of the first signal extraction unit 302, use of the method described in the fourth embodiment to calculate a motion trajectory does not allow a vibration component to be distinguished from an integration error when compensation of an integration error is performed in the data calibration unit 32. In such a case, the amplitude of the vibration component may be underestimated in a motion trajectory resulting from the calculation.

In a fifth embodiment, the reference acceleration sensor 13b and the subject acceleration sensor 13a are used as in the case of the fourth embodiment. In the fifth embodiment, the sensor signal separation unit 30 that is configured similarly to the sensor signal separation unit 30 of the first embodiment is used. Note that, in the sensor signal separation unit 30 according to the fifth embodiment, the acceleration components $A_x$ and $A_y$ measured by the reference acceleration sensor 13b are separated into high frequency band components $Ad_{xh}$ and $Ad_{yh}$ and low frequency band components $Ad_{xl}$ and $Ad_{yl}$, respectively. Furthermore, in the sensor signal separation unit 30 according to the fifth embodiment, the acceleration components $a_x$ and $a_y$ measured by the subject acceleration sensor 13a are separated into high frequency band components $a_{xh}$ and $a_{yh}$ and low frequency band components $a_{xl}$ and $a_{yl}$, respectively.

Figure 19:
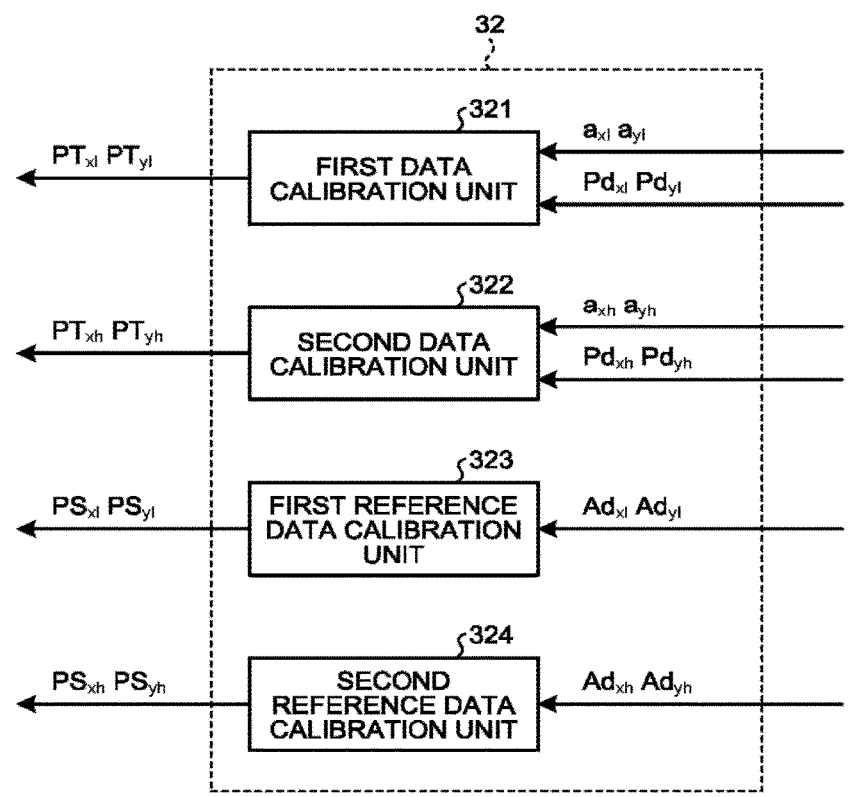
FIG. 19 is a configuration diagram of a data calibration unit included in the machine motion trajectory measuring apparatus according to a fifth embodiment.

FIG. 19 is a configuration diagram of a data calibration unit included in the machine motion trajectory measuring apparatus according to the fifth embodiment. The data calibration unit 32 illustrated in FIG. 19 includes a first reference data calibration unit 323 and a second reference data calibration unit 324, in addition to the first data calibration unit 321 and the second data calibration unit 322.

The low frequency band components $Ad_{xl}$ and $Ad_{yl}$ of reference acceleration separated by the sensor signal separation unit 30 are input to the first reference data calibration unit. The high frequency band components $Ad_{xh}$ and $Ad_{yh}$ of the reference acceleration separated by the sensor signal separation unit 30 are input to the second reference data calibration unit 324. The reference point is a fixed point, not a movable part; thus, there is no need to use a motor detector signal as a reference signal. The first reference data calibration unit 323 calculates reference point displacements $PS_{xl}$ and $PS_{yl}$ from the low frequency band components $Ad_{xl}$ and $Ad_{yl}$ of the reference acceleration. The second reference data calibration unit 324 calculates reference point displacements $PS_{xh}$ and $PS_{yh}$ from the high frequency band components $Ad_{xh}$ and $Ad_{yh}$ of the reference acceleration.

A calculation method of the reference point displacements $PS_{xl}$ and $PS_{yl}$ will now be described. Time-series data $Axl(t)$ of the low frequency band component $A_{xl}$ is converted to a frequency domain of $AXL(j\omega)$ by performing Fourier transformation, where j is an imaginary unit and $\omega$ is an angular frequency. Here, an integration operation in the frequency domain corresponds to calculation of $PSXL(j\omega)$ represented by equation (14) below in the angular frequency $\omega$. Calculating the reference point displacement $PS_{xl}$ by performing inverse Fourier transformation on $PSXL(j\omega)$ enables the integration operation in the frequency domain. Here, if the absolute value of AXL after the Fourier transformation is less than a threshold value that has been set, the frequency component is regarded as a noise component and is not subjected to the integration operation. Thus, accumulation of noise components can be prevented.

[Equation 14]

$$PSXL(j\omega) = -\frac{AXL(j\omega)}{\omega^2} \qquad (14)$$

A low frequency band component $PRxl$ of the relative displacement between the tool 16 and the workpiece 17 can be calculated from the difference between the reference point displacement $PS_{xl}$ and the low frequency band component $PT_{xl}$. Similarly, in the high frequency band, a high frequency band component $PRxh$ of the relative displacement can be calculated from the reference point displacement $PS_{xh}$ and the high frequency band component $PT_{xh}$. Furthermore, a relative displacement PRx between the tool 16 and the workpiece 17 can be calculated from the low frequency band component PRxl and the high frequency band component PRxh.

Figure 20:
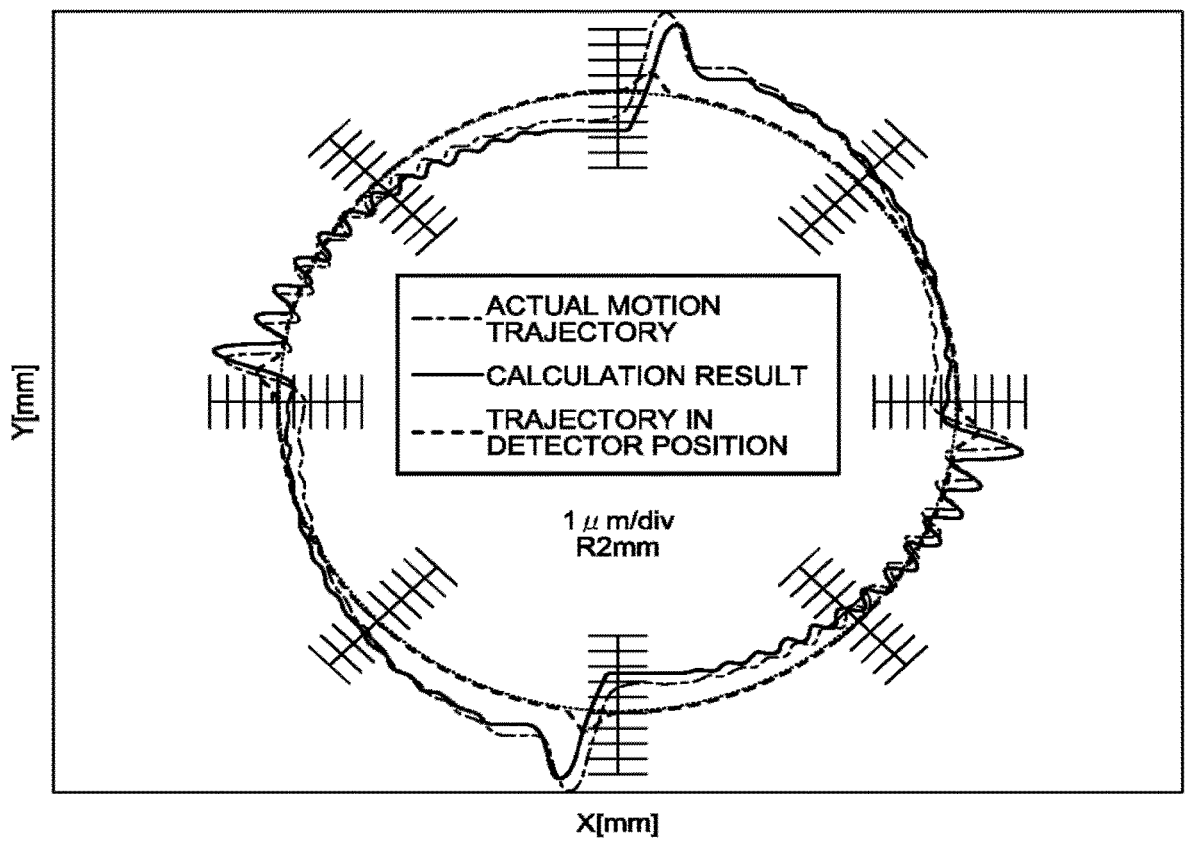
FIG. 20 is a diagram comparing the calculation result in the case where a relative motion trajectory is measured by the machine motion trajectory measuring apparatus according to the fifth embodiment, an actual relative motion trajectory, and a motion trajectory in the detector position.

FIG. 20 is a diagram comparing the calculation result in the case where a relative motion trajectory is measured by the machine motion trajectory measuring apparatus according to the fifth embodiment, an actual relative motion trajectory, and a motion trajectory in the detector position. In FIG. 20, the actual operation trajectory is indicated by an alternate long and short dash line, the calculation result of a trajectory error calculated by the machine motion trajectory measuring apparatus 100 is indicated by a solid line, and the operation trajectory in the detector position indicated by a dotted line. The machine motion trajectory measuring apparatus 100 according to the fifth embodiment enables measurement of an actual relative displacement between the tool 16 and the workpiece 17 with an error of one micrometer and thus enables more highly accurate measurement of the relative displacement.

As described above, when a subject motion trajectory component and a reference motion trajectory component are calculated in each of the frequency bands from the acceleration sensor signal and the reference acceleration sensor signal separated by the sensor signal separation unit, the data calibration unit 32 of the machine motion trajectory measuring apparatus 100 according to the fifth embodiment corrects the calculation error in each of the subject motion trajectory component and the reference motion trajectory component by using the detection position signal in each of the frequency bands separated by the detection position signal separation unit and outputs the difference between the subject motion trajectory component and the reference motion trajectory component as a relative motion trajectory in each of the bands. Calculating a reference motion trajectory enables calculation of a relative motion trajectory with respect to a reference position.

Sixth Embodiment

The configuration of the machine motion trajectory measuring apparatus 100 according to a sixth embodiment is the same as that in the first embodiment. The difference from the first embodiment is that, when integration errors are corrected, the differences between speeds Vxl and Vyl, which are calculated by performing first order integration on acceleration low frequency band components $a_{xl}$ and $a_{yl}$, and Vdxl and Vdyl, which are calculated by performing first order differentiation on motor-signal low frequency band components $Pd_{xl}$ and $Pd_{yl}$, are compensated as speed integration errors, and the differences between Pxl' and Pyl', which are calculated by further performing first order integration after the compensation, and $Pd_{xl}$ and $Pd_{yl}$ are compensated. In this manner, error compensation can be performed before accumulation of integration errors; thus, even in the case where an integration error cannot be compensated after second order integration due to a significant noise level, an integration error can be corrected with high accuracy.

The data calibration unit according to the sixth embodiment is configured to, when data calibration in a high frequency band is performed, convert an input signal into a signal in a low frequency domain, then perform an integration operation in the low frequency domain, and then output a signal resulting from conversion into a time domain by an inverse transform as a high frequency band component of a motion trajectory. By cutting a low frequency component generated due to the integration error and outputting the result, an integration error component can be removed.

The data calibration unit according to the sixth embodiment is also configured to, when data calibration in a low frequency band is performed, correct an error such that the difference between the result of first order integration performed on the acceleration sensor signal separated by the sensor signal separation unit and the result of first order differentiation performed on a low frequency band component of the detection position signal does not exceed a tolerance value. By correcting the integration error after the first order integration is performed, accumulation of errors in the subsequent integration operation can be minimized.

Seventh Embodiment

The configuration of the machine motion trajectory measuring apparatus 100 according to a seventh embodiment is the same as that in the first embodiment. The difference from the first embodiment is that, in the machine motion trajectory measuring apparatus 100 according to the seventh embodiment, a motion trajectory to be measured is a rectangular motion trajectory, in place of a circular one.

Figure 21:
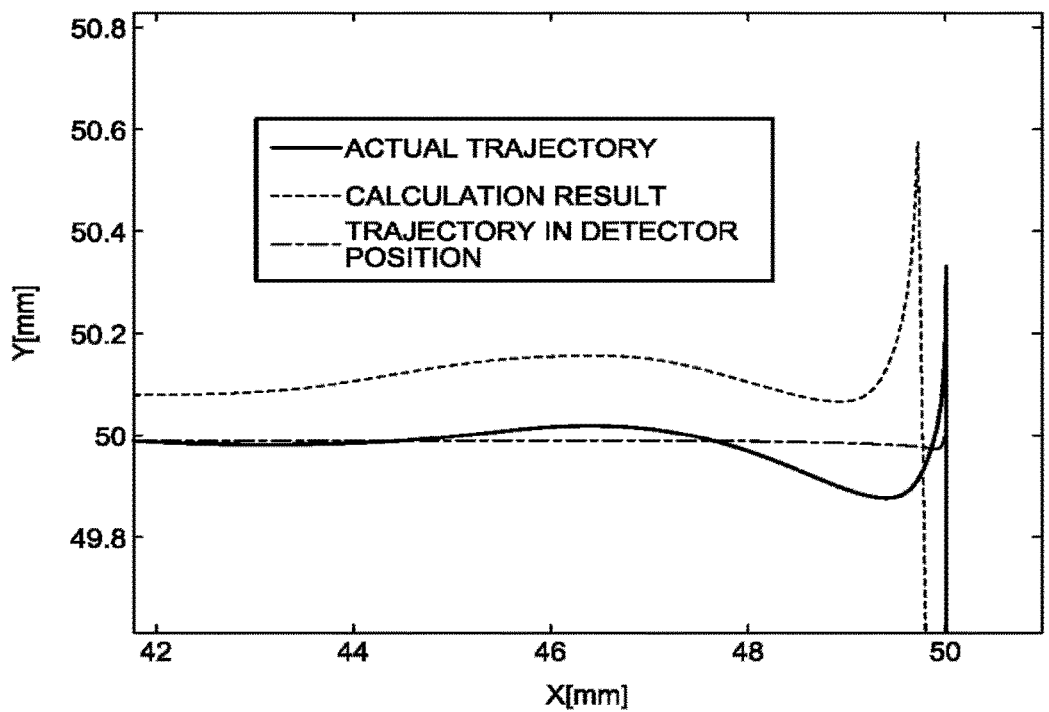
FIG. 21 is a diagram illustrating, in comparison, an actual trajectory obtained when a rectangular motion trajectory command is provided, the calculation result of a trajectory error calculated by the machine motion trajectory measuring apparatus according to a seventh embodiment, and an operation trajectory in the detector position.

FIG. 21 is a diagram illustrating, in comparison, an actual trajectory obtained when a rectangular motion trajectory command is provided, the calculation result of a trajectory error calculated by the machine motion trajectory measuring apparatus according to the seventh embodiment, and an operation trajectory in the detector position. In FIG. 21, a corner portion obtained when the rectangular motion trajectory command is provided is magnified. In FIG. 21, the actual trajectory is indicated by a solid line, the calculation result of the trajectory error calculated by the machine motion trajectory measuring apparatus 100 is indicated by a dotted line, and the operation trajectory in the detector position is indicated by an alternate long and short dash line.

FIG. 21 demonstrates that the actual trajectory agrees well with the motion trajectory of the calculation result. The machine motion trajectory measuring apparatus 100 according to the seventh embodiment can be used not only in motion trajectory measurement in a two-dimensional plane but also in motion trajectory measurement in a three-dimensional space; therefore, it can calculate a motion trajectory with high accuracy for any motion waveform.

Eighth Embodiment

Figure 22:
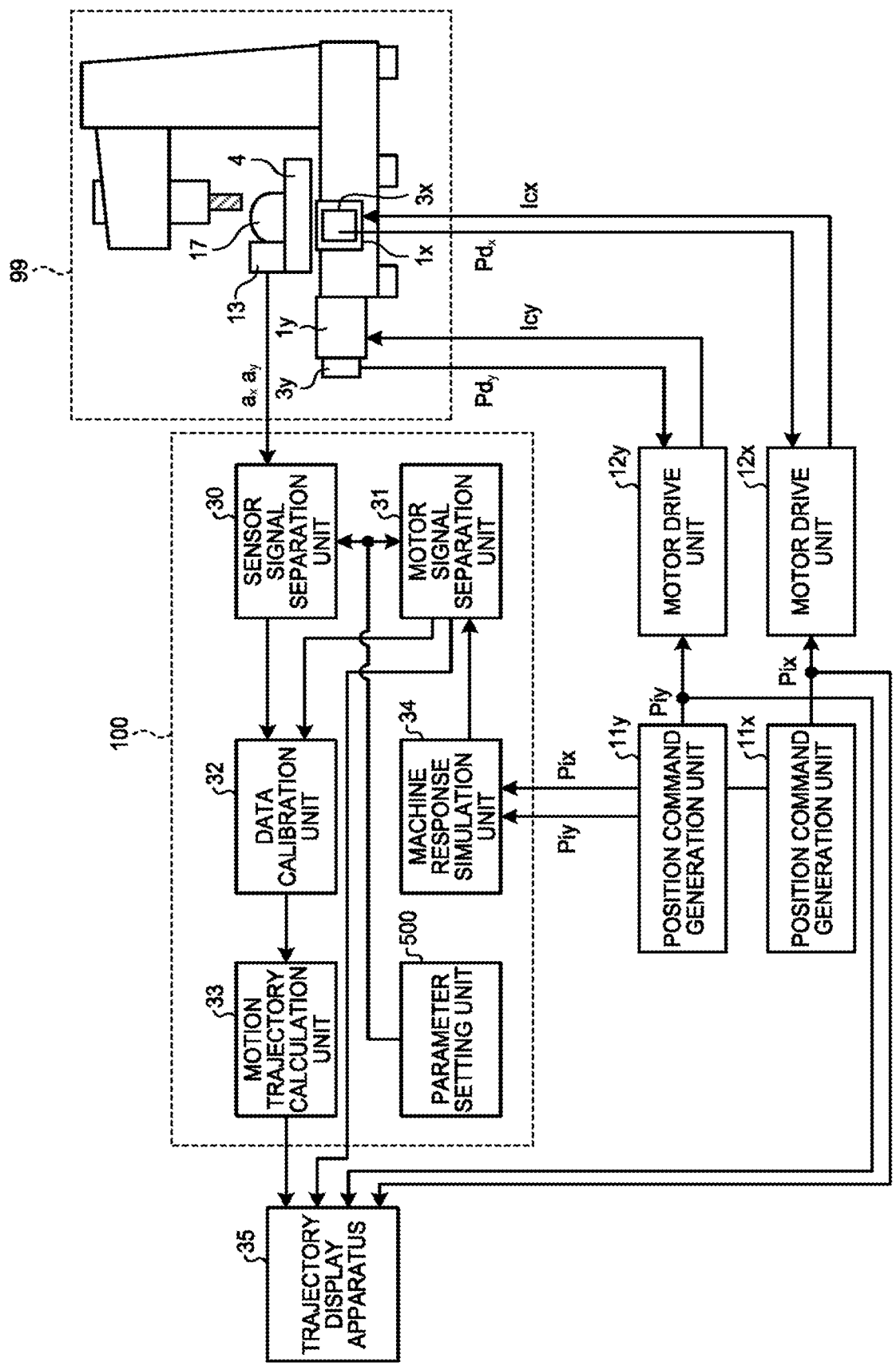
FIG. 22 is a diagram illustrating a machine motion trajectory measuring apparatus according to an eighth embodiment, a numerical control machine tool that uses the machine motion trajectory measuring apparatus according to the eighth embodiment, and a servo control apparatus.

FIG. 22 is a diagram illustrating a machine motion trajectory measuring apparatus according to an eighth embodiment, a numerical control machine tool that uses the machine motion trajectory measuring apparatus according to the eighth embodiment, and a servo control apparatus. The difference from the second embodiment is that the machine motion trajectory measuring apparatus 100 according to the eighth embodiment includes a parameter setting unit 500.

The parameter setting unit 500 notifies each of the sensor signal separation unit 30 and the motor signal separation unit 31 of a filter parameter setting command, which is a filter design parameter. The sensor signal separation unit 30 and the motor signal separation unit 31 generate filters to be used on the basis of the filter parameter setting commands received. The parameters indicated here refer to filter factors a and b indicated in equation (15) below, in the case where, for example, a secondary low-pass filter is used to separate a low frequency band signal in the first signal extraction unit 312.

[Equation 15]

$$G_{filt}(s) = \frac{1}{1 + bs + as^2} \quad (15)$$

The parameters indicated here may be a cutoff frequency ω and attenuation ζ of a filter, which are physical parameters that represent formulated filter characteristics as indicated in equation (16) below, in place of the filter factors a and b in equation (15) described above.

[Equation 16]

$$G_{filt}(s) = \frac{1}{1 + 2\zeta\omega s + \omega^2 s^2} \quad (16)$$

Similarly, the parameter setting unit 500 designs, in advance, an n-th filter represented by equation (17) below for each of the sensor signal separation unit 30 and the motor signal separation unit 31 and transmits parameters of the filters to the sensor signal separation unit 30 and the motor signal separation unit 31.

[Equation 17]

$$G_{filt}(s) = \frac{1 + b_2 s + b_2 s^2 + \ldots + b_i s^i + \ldots b_n s^n}{1 + a_2 s + a_2 s^2 + \ldots + a_i s^i + \ldots a_n s^n} \quad (17)$$

A filter that has given characteristics expressed by a transfer function up to the n-th can be achieved by setting a higher order factor in each of the denominator and the numerator in equation (17) described above to zero in accordance with the necessary filter order. When a machine motion trajectory is measured under multiple measuring conditions, the optimal filter characteristics may differ under different conditions. In such a case, an optimal filter can be used at all times by changing a parameter for every measuring condition from the parameter setting unit 500 every time a measuring condition is changed.

In the machine motion trajectory measuring apparatus 100 according to the eighth embodiment, an effort to set a filter in each of the sensor signal separation unit 30 and the motor signal separation unit 31 individually can be saved by the parameter setting unit 500 setting parameters for the filters and notifying the sensor signal separation unit 30 and the motor signal separation unit 31 of the parameters. Additionally, in the case where a filter setting is changed frequently, the filter characteristics can be changed efficiently.

Ninth Embodiment

Figure 23:
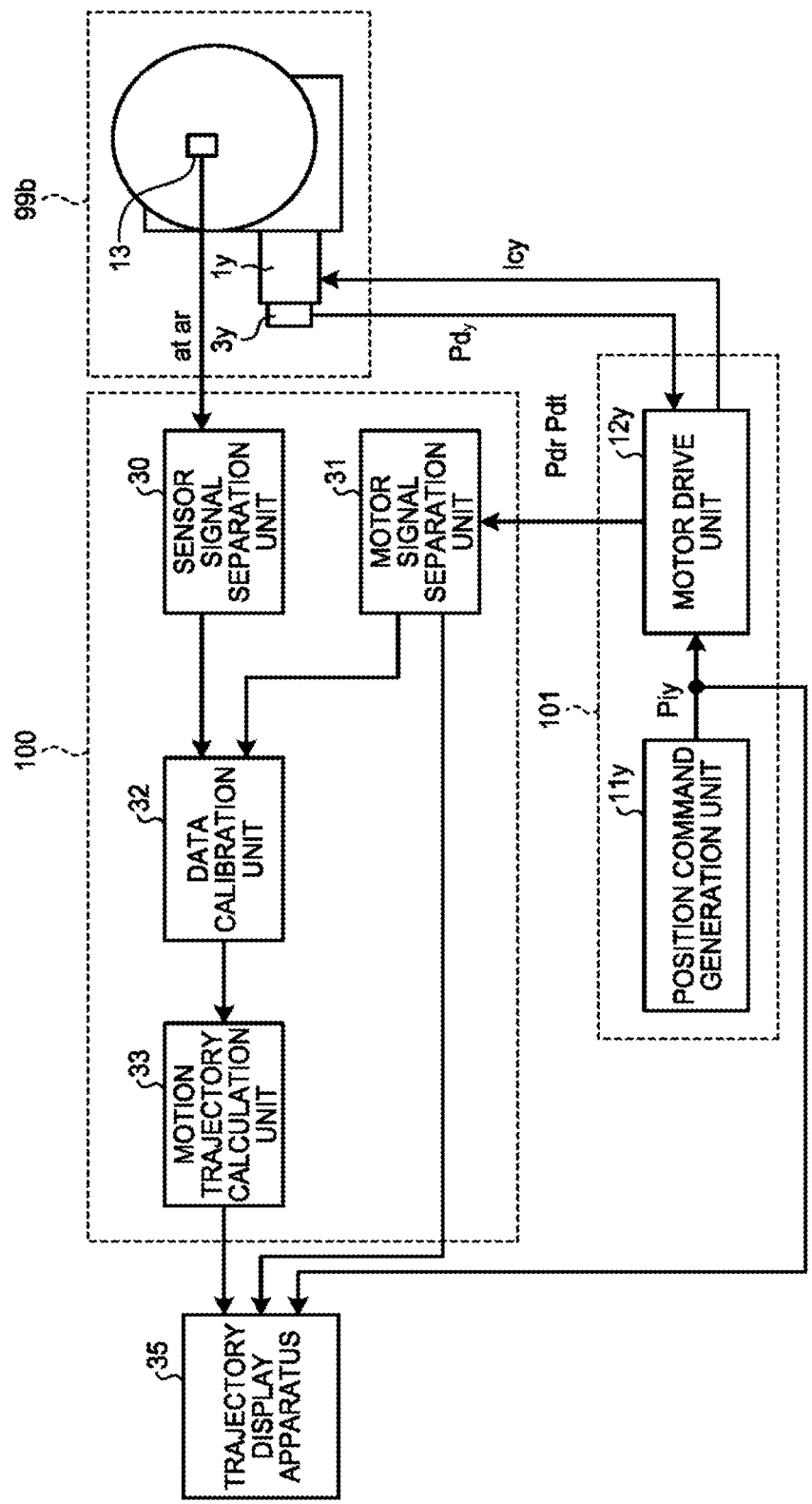
FIG. 23 is a diagram illustrating a machine motion trajectory measuring apparatus according to a ninth embodiment, a numerical control machine tool that uses the machine motion trajectory measuring apparatus according to the ninth embodiment, and a servo control apparatus.
Figure 24:
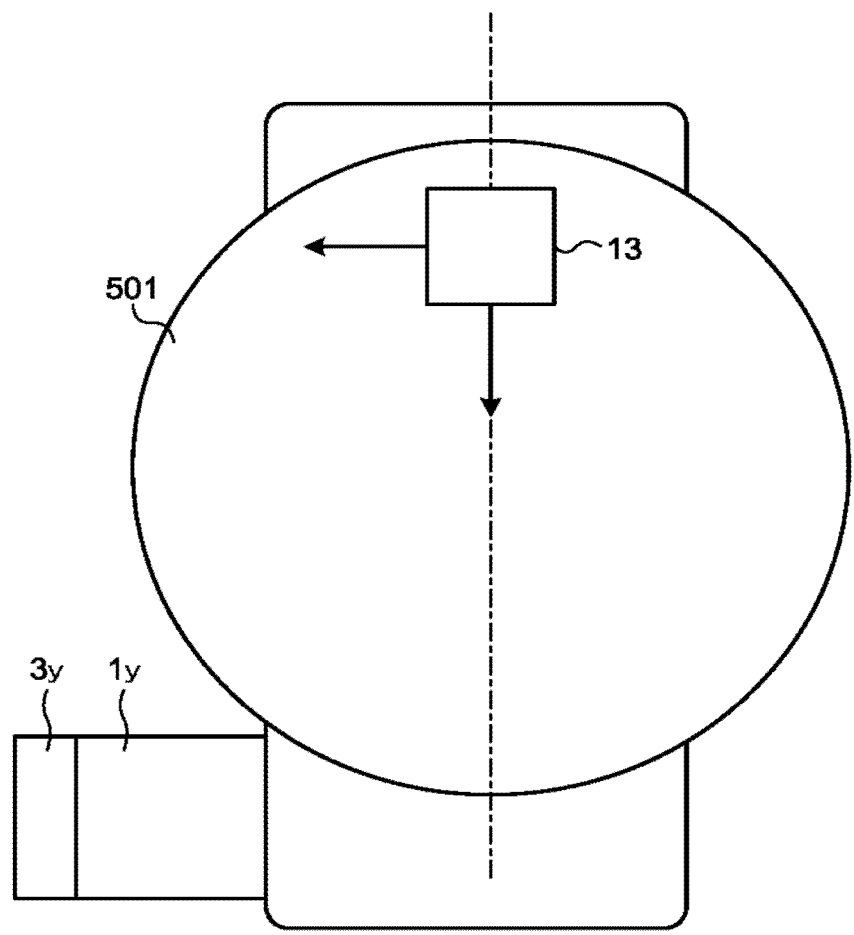
FIG. 24 is a schematic diagram illustrating an example numerical control machine tool that uses the machine motion trajectory measuring apparatus according to the ninth embodiment.

FIG. 23 is a diagram illustrating a machine motion trajectory measuring apparatus according to a ninth embodiment, a numerical control machine tool that uses the machine motion trajectory measuring apparatus according to the ninth embodiment, and a servo control apparatus. FIG. 24 is a schematic diagram illustrating an example numerical control machine tool that uses the machine motion trajectory measuring apparatus according to the ninth embodiment. The difference from the first embodiment is that, in a numerical control machine tool 99b, the three-axis acceleration sensor 13 is attached to a rotary table 501.

The three-axis acceleration sensor 13 is installed in such a manner that one of its axial directions is in a normal direction of the rotary table 501, i.e., a direction in which an undepicted straight line that passes through the rotation center of the circular table extends, and another of its axes agrees with a tangential direction of the rotation, i.e., the radial direction of the rotary table 501.

In the case where the three-axis acceleration sensor 13 is attached to a table having two orthogonal axes, such as the numerical control machine tool 99 used in up to the eighth embodiment, the orientation of the sensor is unchanged while a rotation is made in a circular motion. In contrast, the three-axis acceleration sensor 13 attached to the rotary table 501 changes in orientation during the rotation.

Figure 25:
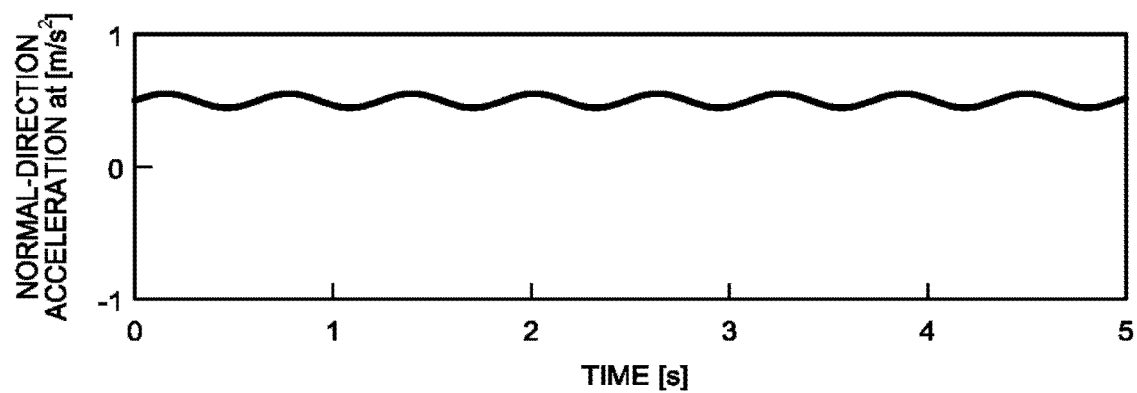
FIG. 25 is a diagram illustrating an example measurement result of normal-direction acceleration, which is measured when the rotary table is driven.
Figure 26:
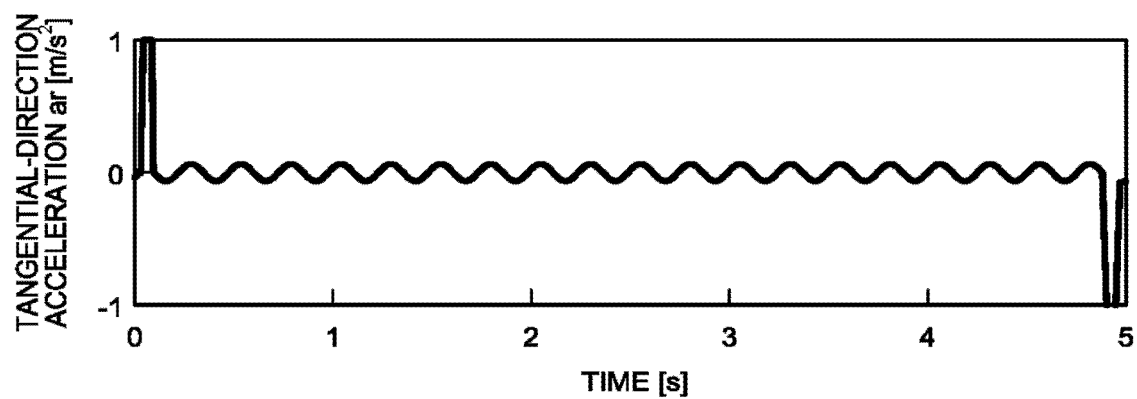
FIG. 26 is a diagram illustrating an example measurement result of tangential-direction acceleration, which is measured when the rotary table is driven.

FIG. 25 is a diagram illustrating an example measurement result of normal-direction acceleration which is measured when the rotary table is driven. FIG. 26 is a diagram illustrating an example measurement result of tangential-direction acceleration ar, which is measured when the rotary table is driven. The vertical axis in FIG. 25 represents the normal-direction acceleration at and the horizontal axis in FIG. 25 represents time. The vertical axis in FIG. 26 represents the tangential-direction acceleration ar and the horizontal axis in FIG. 26 represents time.

In the case of the normal-direction acceleration at, due to the effect of centripetal acceleration, an error component of vibration is superimposed with nominal centripetal acceleration at the center during the circular motion. In the case of the tangential-direction acceleration ar, an error component of vibration is superimposed with zero at the center. The motor drive unit 12y outputs a tangential-direction component Pdr from the feedback position $Pd_y$ as represented by equation (18) below. Here, in the case of the rotary table, the feedback position $Pd_y$ represents a rotary angle of the table in radians. The motor drive unit 12y outputs a normal-direction component Pdt of a motion trajectory from a distance Rcom as represented by equation (19) below. The distance Rcom is a distance from the center of rotation of the rotary table 501 to where the three-axis acceleration sensor 13 is attached.

[Equation 18]

$$Fdr = Rcom \times Fd_y \quad (18)$$

[Equation 19]

$$Pdt = Rcom \quad (19)$$

As in the case with the first embodiment, the sensor signal separation unit 30 and the motor signal separation unit 31 perform separation into frequency bands by using the tangential-direction acceleration ar, the normal-direction acceleration at, the tangential-direction component Pdr, and the normal-direction component Pdt. The trajectory coupling unit 331 of the motion trajectory calculation unit 33 calculates a tangential-direction trajectory PTr and a normal-direction trajectory PTt. The trajectory error calculation unit 332 of the motion trajectory calculation unit 33 calculates an x axis direction component $PT_x$ by using a computational expression represented by equation (20) below and calculates a y axis direction component $PT_y$ by using a computational expression represented by equation (21) below. In this manner, the motion trajectory calculation unit 33 calculates trajectory errors similarly to equations (9) and (10) described above in the first embodiment.

[Equation 20]

$$PT_x = PTr \times \cos(PTt) \quad (20)$$

[Equation 21]

$$PT_y = PTr \times \sin(PTt) \quad (21)$$

The machine motion trajectory measuring apparatus 100 according to the ninth embodiment enables calculation of a machine motion trajectory also for a machine having a configuration in which the rotary table 501 is driven.

The machine motion trajectory measuring apparatus 100 according to the first to ninth embodiments can be also used for a machine apparatus that has one or more movable shafts and drives a subject to be controlled using an actuator, such as an industrial machine, a robot, or a transfer machine.

Note that the configurations described in the foregoing embodiments are examples of the present invention; combining the present invention with other publicly known techniques is possible, and partial omissions and modifications are possible without departing from the spirit of the present invention.

REFERENCE SIGNS LIST 1x x-axis motor, 1y y-axis motor, 1z z-axis motor, 2x, 2y, 2z feed screw, 3x, 3y, 3z rotary angle detector, 4 work table, 5 column, 6 ram, 7 spindle, 8x coupling, 9x nut, 10x support bearing, 11x, 11y position command generation unit, 12x, 12y motor drive unit, 13 three-axis acceleration sensor, 13a subject acceleration sensor, 13b reference acceleration sensor, 15x x-axis driving mechanism, 15y y-axis driving mechanism, 15z z-axis driving mechanism, 16 tool, 17 workpiece, 21 mounting, 24 saddle, 30 sensor signal separation unit, 31 motor signal separation unit, 32 data calibration unit, 33 motion trajectory calculation unit, 34 machine response simulation unit, 35 trajectory display apparatus, 40 cable, 99, 99b numerical control machine tool, 100 machine motion trajectory measuring apparatus, 101 servo control apparatus, 121 speed control unit, 122 differential operation unit, 123, 123A position control unit, 124a, 124b adder-subtracter unit, 301 first noise removal unit, 302, 312 first signal extraction unit, 303, 313 second signal extraction unit, 304 relative acceleration calculation unit, 311 second noise removal unit, 321 first data calibration unit, 322 second data calibration unit, 323 first reference data calibration unit, 324 second reference data calibration unit, 331 trajectory coupling unit, 332 trajectory error calculation unit, 341 machine model, 500 parameter setting unit, 501 rotary table.

The invention claimed is:

1. A machine motion trajectory measuring apparatus that measures a motion trajectory of a machine apparatus that comprises an actuator and that feeds back a detection position signal output from a position detector that detects a position of the actuator or a position of a driven body and drives the actuator such that a motion trajectory of the driven body follows a command trajectory, the machine motion trajectory measuring apparatus comprising:
an acceleration sensor to measure acceleration of a motion-trajectory measurement subject and output a result as an acceleration sensor signal;
a sensor signal separator to separate the acceleration sensor signal into two or more frequency bands;
a detection position signal separator to separate the detection position signal into frequency bands identical to the frequency bands of the sensor signal separator;
a data calibrator to calibrate the acceleration sensor signal in each of the two or more frequency bands by using the acceleration sensor signal separated by the sensor signal separator and the detection position signal separated by the detection position signal separator and to obtain a motion trajectory component in each of the two or more frequency bands; and
a motion trajectory calculator to couple the motion trajectory component in each of the two or more frequency bands and output a result as the motion trajectory.

2. The machine motion trajectory measuring apparatus according to claim 1, wherein the sensor signal separator separates the acceleration sensor signal into two bands of a high frequency band and a low frequency band and outputs the acceleration sensor signal after the frequency separation.

3. The machine motion trajectory measuring apparatus according to claim 2, wherein the sensor signal separator separates the acceleration sensor signal into three bands of the high frequency band, the low frequency band, and a noise band.

4. The machine motion trajectory measuring apparatus according to claim 3, wherein the low frequency band is a control band of the machine apparatus that drives the actuator, the high frequency band is a vibration frequency component of the machine apparatus that drives the actuator, and the noise band is a noise component of the acceleration sensor signal.

5. The machine motion trajectory measuring apparatus according to claim 4, wherein the sensor signal separator comprises a high frequency band filter designed such that a sum of a transfer function of the low frequency band filter and a transfer function of the high frequency band filter is one.

6. The machine motion trajectory measuring apparatus according to claim 1, wherein the sensor signal separator has a transfer function that simulates a response of a position control system of a feed shaft included in the machine apparatus that drives the actuator.

7. The machine motion trajectory measuring apparatus according to claim 1, wherein, when a calculation error in a motion trajectory component is corrected in each of the frequency bands from the acceleration sensor signal separated by the sensor signal separator, the data calibrator uses the detection position signal in each of the frequency bands separated by the detection position signal separator.

8. The machine motion trajectory measuring apparatus according to claim 7, wherein, when data calibration is performed, the data calibrator performs second order integration on an acceleration input signal and corrects an integration error such that a mean value of an integration result is zero.

9. The machine motion trajectory measuring apparatus according to claim 8, wherein, when data calibration in a high frequency band is performed, the data calibrator removes a frequency component less than a pass band of a high-pass filter from a signal output as the integration result and outputs the signal.

10. The machine motion trajectory measuring apparatus according to claim 7, wherein, when data calibration in a high frequency band is performed, the data calibrator converts an input signal into a signal in a low frequency domain, then performs an integration operation in the low frequency domain, and then outputs a signal resulting from conversion into a time domain by an inverse transform as a high frequency band component of a motion trajectory.

11. The machine motion trajectory measuring apparatus according to claim 7, wherein, when data calibration in a low frequency band is performed, the data calibrator corrects an error such that a difference between a result of first order integration performed on the acceleration sensor signal separated by the sensor signal separator and a result of first order differentiation performed on a low frequency band component of the detection position signal does not exceed a tolerance value.

12. The machine motion trajectory measuring apparatus according to claim 7, wherein, when data calibration in a low frequency band is performed, the data calibrator corrects an error such that a difference between a result of second order integration performed on the acceleration sensor signal separated by the sensor signal separator and a low frequency band component of the detection position signal does not exceed a tolerance value and calculates a motion trajectory of a subject in the low frequency band.

13. The machine motion trajectory measuring apparatus according to claim 1, further comprising a motion trajectory display to display a motion trajectory of the machine apparatus, wherein
the motion trajectory display synthesizes a target trajectory from a target position that is input to a position command generator, synthesizes a command trajectory from a command position that is output from the position command generator, synthesizes a detector trajectory from the detection position signal, and displays, on the motion trajectory display, one of the target trajectory, the command trajectory, and the detector trajectory, as superimposed on a motion trajectory of the machine apparatus.

14. A machine motion trajectory measuring apparatus that measures a motion trajectory of a machine apparatus that comprises an actuator and that feeds back a detection position signal output from a position detector that detects a position of the actuator or a position of a driven body and drives the actuator such that a motion trajectory of the driven body follows a command trajectory, the machine motion trajectory measuring apparatus comprising:
an acceleration sensor to measure acceleration of a motion-trajectory measurement subject and output a result as an acceleration sensor signal;
a reference acceleration sensor to measure acceleration of a point serving as a reference for trajectory measurement of the motion-trajectory measurement subject and output a result as a reference acceleration sensor signal;
a sensor signal separator to separate each of the acceleration sensor signal and the reference acceleration sensor signal into two or more frequency bands;

a detection position signal separator to separate the detection position signal into frequency bands identical to the frequency bands of the sensor signal separator;

a data calibrator to calibrate the acceleration sensor signal in each of the two or more frequency bands by using the acceleration sensor signal separated by the sensor signal separator, the reference acceleration sensor signal separated by the sensor signal separator, and the detection position signal separated by the detection position signal separator and to obtain a motion trajectory component in each of the two or more frequency bands; and a motion trajectory calculator to couple the motion trajectory component in each of the two or more frequency bands and output a result as information indicative of the motion trajectory.

15. The machine motion trajectory measuring apparatus according to claim 14, wherein the sensor signal separator separates one of the acceleration sensor signal and the reference acceleration sensor signal into two bands of a high frequency band and a low frequency band and outputs the one of the acceleration sensor signal and the reference acceleration sensor signal after the frequency separation.

16. The machine motion trajectory measuring apparatus according to claim 14, wherein, when a subject motion trajectory component and a reference motion trajectory component are calculated in each of the frequency bands from the acceleration sensor signal and the reference acceleration sensor signal separated by the sensor signal separator, the data calibrator corrects a calculation error in each of the subject motion trajectory component and the reference motion trajectory component by using the detection position signal in each of the frequency bands separated by the detection position signal separator and outputs a difference between the subject motion trajectory component and the reference motion trajectory component as a relative motion trajectory in each of the bands.

17. The machine motion trajectory measuring apparatus according to claim 16, wherein, when data calibration is performed, the data calibrator performs second order integration on an acceleration input signal and corrects an integration error such that a mean value of an integration result is zero.

18. The machine motion trajectory measuring apparatus according to claim 17, wherein, when data calibration in a high frequency band is performed, the data calibrator removes a frequency component less than a pass band of a high-pass filter from a signal output as the integration result and outputs the signal.

19. The machine motion trajectory measuring apparatus according to claim 16, wherein, when data calibration in a high frequency band is performed, the data calibrator converts an input signal into a signal in a low frequency domain, then performs an integration operation in the low frequency domain, and then outputs a signal resulting from conversion into a time domain by an inverse transform as a high frequency band component of a motion trajectory.

20. The machine motion trajectory measuring apparatus according to claim 16, wherein, when data calibration in a low frequency band is performed, the data calibrator corrects an error such that a difference between a result of first order integration performed on the acceleration sensor signal separated by the sensor signal separator and a result of first order differentiation performed on a low frequency band component of the detection position signal does not exceed a tolerance value.

21. The machine motion trajectory measuring apparatus according to claim 16, wherein, when data calibration in a low frequency band is performed, the data calibrator corrects an error such that a difference between a result of second order integration performed on the acceleration sensor signal separated by the sensor signal separator and a low frequency band component of the detection position signal does not exceed a tolerance value and calculates a motion trajectory of a subject in the low frequency band.

22. The machine motion trajectory measuring apparatus according to claim 14, wherein the sensor signal separator has a transfer function that simulates a response of a position control system of a feed shaft included in the machine apparatus that drives the actuator.

23. The machine motion trajectory measuring apparatus according to claim 14, further comprising a motion trajectory display to display a motion trajectory of the machine apparatus, wherein the motion trajectory display synthesizes a target trajectory from a target position that is input to a position command generator, synthesizes a command trajectory from a command position that is output from the position command generator, synthesizes a detector trajectory from the detection position signal, and displays, on the motion trajectory display, one of the target trajectory, the command trajectory, and the detector trajectory, as superimposed on a motion trajectory of the machine apparatus.

* * * * *